United States Patent
Hisatsugu et al.

(10) Patent No.: US 10,974,599 B2
(45) Date of Patent: Apr. 13, 2021

(54) VEHICULAR DISPLAY DEVICE AND ILLUMINATION DEVICE

(71) Applicant: DENSO CORPORATION, Kariya (JP)

(72) Inventors: Shinsuke Hisatsugu, Kariya (JP); Yoshio Oofuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/723,729

(22) Filed: Dec. 20, 2019

(65) Prior Publication Data

US 2020/0139815 A1 May 7, 2020

Related U.S. Application Data

(63) Continuation of application No. PCT/JP2018/023082, filed on Jun. 18, 2018.

(30) Foreign Application Priority Data

| Jun. 30, 2017 | (JP) | JP2017-128258 |
| Jun. 30, 2017 | (JP) | JP2017-128260 |
| Mar. 29, 2018 | (JP) | JP2018-064210 |
| May 9, 2018 | (JP) | JP2018-090780 |

(51) Int. Cl.
*B60K 37/02* (2006.01)
*B60Q 1/26* (2006.01)
*B60R 11/04* (2006.01)

(52) U.S. Cl.
CPC ............ *B60K 37/02* (2013.01); *B60Q 1/2696* (2013.01); *B60R 11/04* (2013.01); *B60K 2370/152* (2019.05)

(58) Field of Classification Search
CPC .............. B60K 37/02; B60K 2370/152; B60K 2370/341; B60K 2370/332; B60Q 1/2696; B60R 11/04
USPC ......................................................... 348/148
See application file for complete search history.

(56) References Cited

U.S. PATENT DOCUMENTS

| 2007/0268714 A1* | 11/2007 | Chen ........................ B60Q 3/12 362/510 |
| 2008/0068462 A1* | 3/2008 | Koumura ............... H04N 7/183 348/148 |
| 2008/0186701 A1 | 8/2008 | Omi |
| 2010/0288573 A1 | 11/2010 | Nishina |
| 2018/0178651 A1 | 6/2018 | Toyota et al. |

FOREIGN PATENT DOCUMENTS

| JP | 201018121 A | 1/2010 |
| JP | 2010176382 A | 8/2010 |
| JP | 4640404 B2 | 3/2011 |
| JP | 4900877 B2 | 3/2012 |
| JP | 5122782 B2 | 1/2013 |
| JP | 5522153 B2 | 6/2014 |

(Continued)

*Primary Examiner* — Jared Walker
(74) *Attorney, Agent, or Firm* — Harness, Dickey & Pierce, P.L.C.

(57) ABSTRACT

A vehicular display device is to be mounted on a vehicle. The vehicular display device displays information. The vehicular display device may emits near-infrared light including light having an upper-bound wavelength of visible light to a viewing side. The vehicular display device may disguise the light having the upper-bound wavelength of the visible light.

20 Claims, 28 Drawing Sheets

(56) References Cited

FOREIGN PATENT DOCUMENTS

| | | | |
|---|---|---|---|
| JP | 5590412 | B2 | 9/2014 |
| JP | 5955153 | B2 | 7/2016 |
| JP | 2017026344 | A | 2/2017 |

* cited by examiner

VEHICULAR DISPLAY DEVICE AND ILLUMINATION DEVICE

CROSS REFERENCE TO RELATED APPLICATIONS

The present application is a continuation application of International Patent Application No. PCT/JP2018/023082 filed on Jun. 18, 2018, which designated the U.S. and claims the benefit of priority from Japanese Patent Application No. 2017-128258 filed on Jun. 30, 2017, Japanese Patent Application No. 2018-64210 filed on Mar. 29, 2018, Japanese Patent Application No. 2017-128260 filed on Jun. 30, 2017, and Japanese Patent Application No. 2018-90780 filed on May 9, 2018. The entire disclosures of all of the above applications are incorporated herein by reference.

TECHNICAL FIELD

The present disclosure relates to a vehicular display device and an illumination device.

BACKGROUND

An imaging system that illuminates an imaging target (such as the face of a vehicle occupant) in a vehicle and images the target has been proposed.

SUMMARY

The present disclosure provides a vehicular display device. The vehicular display device displays information. The vehicular display device may emits near-infrared light including light having an upper-bound wavelength of visible light to a viewing side. The vehicular display device may disguise the light having the upper-bound wavelength of the visible light.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
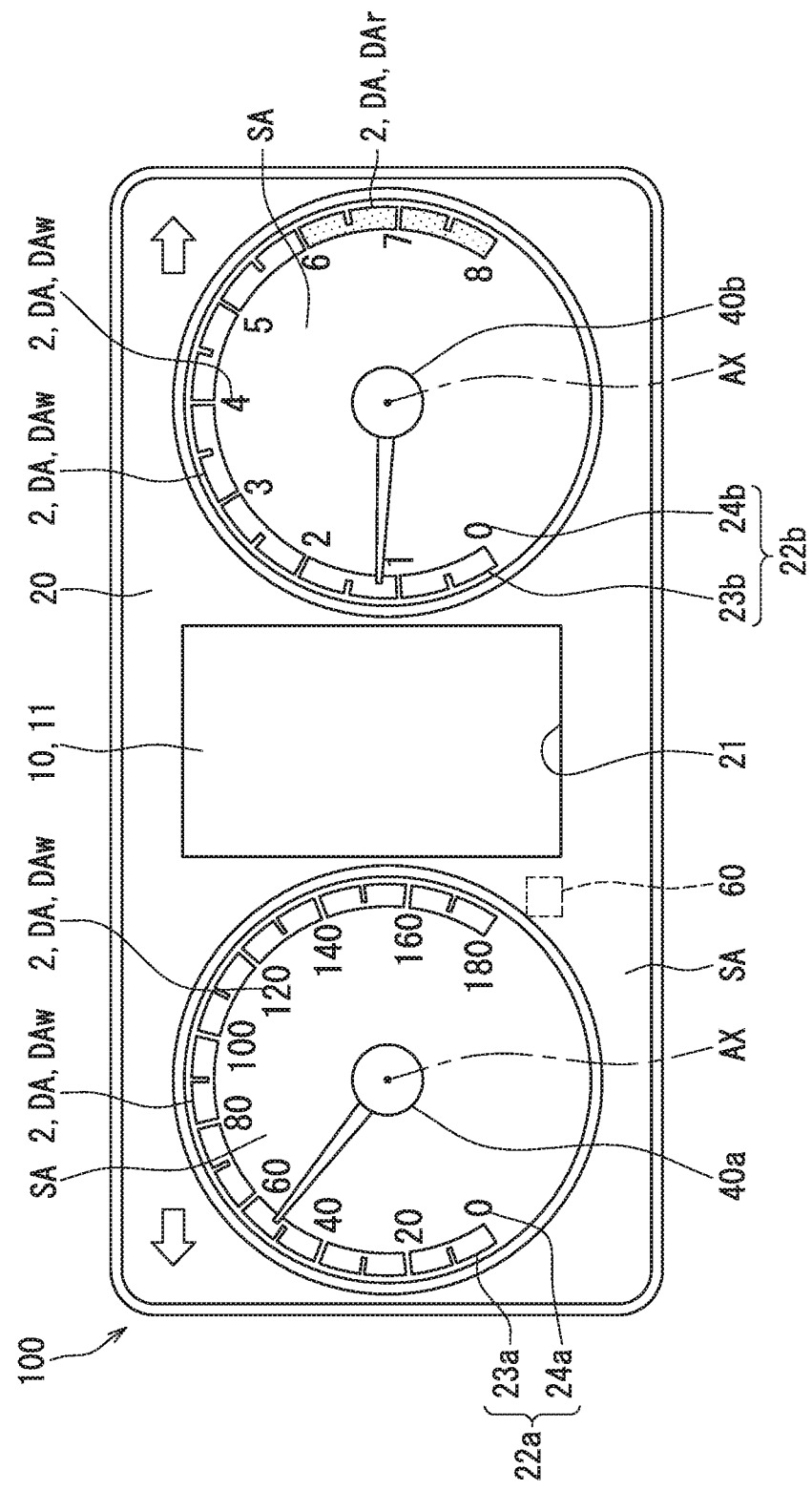
FIG. 1 is a front view illustrating a vehicular display device according to a first embodiment.

For example, an imaging system includes a near-infrared irradiation portion and an imaging portion placed under a lower cover of a steering column. The near-infrared irradiation portion emits near-infrared light including the upper-bound visible light. The imaging portion images an imaging target (such as the face of a vehicle occupant) illuminated by the near-infrared irradiation portion.

There is known a vehicular display device displays information. For example, a device places the imaging portion used for the above-described system opposite the viewing side of a dial plate. The dial plate is printed with near-infrared selectively transmitting ink. The near-infrared selectively transmitting ink transmits the light having a wavelength of 850 nm or more and does not transmit the light having the other wavelengths such as the visible light.

Until now, there has been known an illumination device and emits the illuminating light to image a vehicle occupant. For example, an illumination device includes a plurality of infrared projectors. Each infrared projector is provided as an LED lamp that emits the illuminating light in the form of point light sources near a light-emitting portion on condition that the illuminating light is assumed to be the near-infrared light including the light having the upper-bound wavelength of the visible light.

The inventors examined a configuration that places the near-infrared irradiation portion opposite the viewing side of the dial plate printed with the near-infrared selectively transmitting ink.

According to this configuration, however, the dial plate blocks out the light having the upper-bound wavelength of the visible light (such as 780 to 830 nm). The near-infrared irradiation portion cannot emit the light having the upper-bound wavelength of the visible light to the viewing side. As a result, the light that is sensed by the imaging portion is limited to the light having a wavelength of 850 nm or more that passes through the near-infrared selectively transmitting ink. For example, the light intensity is insufficient for sensing by the imaging portion, causing a possibility of degrading the imaging quality.

Then, the inventors examined a configuration that allows the dial plate to transmit the whole of the near-infrared light including the upper-bound visible light the near-infrared irradiation portion emitted. However, this configuration allows a vehicle occupant to also visually recognize the upper-bound visible light included in the near-infrared light emitted from the near-infrared irradiation portion when visually recognizing the information displayed on a vehicular display device, causing a possibility of giving a complicated impression to the occupant.

The light having the upper-bound wavelength of the visible light (780 to 830 nm) included in the near-infrared light features degraded sensitivity but can be sensed when the occupant visually recognizes the light. The infrared projector emits the near-infrared light including the light having the upper-bound wavelength of the visible light in the form of point light sources toward the occupant and therefore increases the luminosity of the upper-bound visible light per unit area. The occupant can easily sense the light. The light having the upper-bound wavelength of the visible light, when sensed, causes a possibility of degrading the appearance of the illumination device or giving a complicated impression to the occupant.

The present disclosure provides a vehicular display device capable of suppressing a complicated impression.

The present disclosure provides an imaging system capable of suppressing degradation of the imaging quality as well as suppressing a complicated impression on the vehicular display device.

The present disclosure provides an illumination device capable of suppressing a complicated impression.

An example embodiment of the present disclosure provides a vehicular display device. The vehicular display device is to be mounted on a vehicle and displays information. The vehicular display device includes a near-infrared irradiation portion and a disguise portion. The near-infrared irradiation portion emits near-infrared light including light having an upper-bound wavelength of visible light to a viewing side. The disguise portion disguises the light having the upper-bound wavelength of the visible light.

In the example embodiment of the present disclosure, with the vehicular display device, the disguise portion disguises the light having the upper-bound wavelength of the visible light. It is difficult for an occupant to distinctly recognize the disguised light having the upper-bound wavelength of the visible light even when the near-infrared irradiation portion emits the near-infrared light including the light having the upper-bound wavelength of the visible light to the viewing side. As a result, it is possible to restrain the vehicle occupant from receiving a complicated impression on the displayed information the occupant visually recognizes.

Another example embodiment of the present disclosure provides an imaging system. The imaging system is placed inside a vehicular display device to display information of a vehicle. The imaging system illuminates and images an imaging target inside the vehicle. The imaging system includes a near-infrared irradiation portion and an imaging portion. The near-infrared irradiation portion emits near-infrared light including light having an upper-bound wavelength of visible light to a viewing side. The imaging portion images the imaging target emitted by the near-infrared irradiation portion. The light having the upper-bound wavelength of the visible light emitted by the near-infrared irradiation portion is disguised by a disguise portion provided in the vehicular display device.

In another example embodiment of the present disclosure, with the imaging system, the disguise portion disguises the light having the upper-bound wavelength of the visible light. It is difficult for the occupant to distinctly identify the disguised light having the upper-bound wavelength of the visible light even when the near-infrared irradiation portion emits the near-infrared light including the light having the upper-bound wavelength of the visible light to the viewing side. As a result, it is possible to restrain the vehicle occupant from receiving a complicated impression on the displayed information the occupant visually recognizes.

The disguised light having the upper-bound wavelength of the visible light reduces a complicated impression and illuminates an imaging target the imaging portion can sense for imaging. It is possible to restrain the imaging quality from degrading.

Another example embodiment of the present disclosure provides an illumination device. The illumination device is to be mounted on a vehicle and emits illuminating light to image an occupant of the vehicle. The illumination device includes a planarly light-emitting portion. The planarly light-emitting portion planarly emits the illuminating light as near-infrared light including light having an upper-bound wavelength of visible light. The planarly light-emitting portion causes luminosity of the illuminating light per unit area at a maximal position, which maximizes the luminosity of the illuminating light per unit area, to be smaller than a sensing limit value. The sensing limit value is a lower limit value that enables the occupant to distinctly sense the light having the upper-bound wavelength of the visible light.

In another example embodiment of the present disclosure, with the above-described illumination device, the planarly light-emitting portion planarly emits the illuminating light as the near-infrared light including the light having the upper-bound wavelength of the visible light. The luminosity per unit area can be decreased by planarly distributing the light emission. The light emission is distributed also at the maximal position maximizing the luminosity per unit area in the planarly light-emitting portion so that the luminosity per unit area is smaller than the sensing limit value. When viewing the planarly light-emitting portion, the occupant can hardly sense the light having the upper-bound wavelength of the visible light as being distinct. It is possible to restrain a complicated impression from being given to the occupant.

Another example embodiment of the present disclosure provides an imaging system. The imaging system includes an imaging device and an illumination device. The imaging device is to be mounted on a vehicle and images an occupant of the vehicle. The illumination device illuminates the occupant imaged by the imaging device by using illuminating light. The illumination device includes a planarly light-emitting portion to planarly emit the illuminating light as near-infrared light including light having an upper-bound wavelength of visible light. The planarly light-emitting portion causes luminosity of the illuminating light per unit area to be smaller than a sensing limit value at a maximal position that maximizes the luminosity of the illuminating light per unit area. The sensing limit value is a lower limit value that enables the occupant to distinctly sense the light having the upper-bound wavelength of the visible light.

In another example embodiment of the present disclosure, with the above-described imaging system, the planarly light-emitting portion planarly emits the illuminating light as the near-infrared light including the light having the upper-bound wavelength of the visible light. The luminosity per unit area can be decreased by planarly distributing the light emission. The light emission is distributed also at the maximal position maximizing the luminosity per unit area in the planarly light-emitting portion so that the luminosity per unit area is smaller than the sensing limit value. When viewing the planarly light-emitting portion, the occupant can hardly sense the light having the upper-bound wavelength of the visible light as being distinct. It is possible to restrain a complicated impression from being given to the occupant.

The imaging device can sense and image the light having the upper-bound wavelength of the visible light to be hardly sensed as being distinct. The imaging system can effectively use the illuminating light and thereby restrain the imaging quality from degrading.

Another example embodiment of the present disclosure provides a vehicular display device. The vehicular display device is to be mounted on a vehicle and displays information to a viewing side and emit illuminating light to image an occupant of the vehicle. The vehicular display device includes a planarly light-emitting portion. The planarly light-emitting portion planarly emits the illuminating light as near-infrared light including upper-bound visible light. The planarly light-emitting portion causes luminosity of the illuminating light per unit area to be smaller than a sensing limit value at a maximal position that maximizes the luminosity of the illuminating light per unit area. The sensing limit value is a lower limit value that enables the occupant to distinctly sense the light having the upper-bound wavelength of the visible light.

In another example embodiment of the present disclosure, with the above-described vehicular display device, the planarly light-emitting portion planarly emits the illuminating light as the near-infrared light including the light having the upper-bound wavelength of the visible light. The luminosity per unit area can be decreased by planarly distributing the light emission. The light emission is distributed also at the maximal position maximizing the luminosity per unit area in the planarly light-emitting portion so that the luminosity per unit area is smaller than the sensing limit value. When viewing the displayed information, the occupant can hardly sense the light having the upper-bound wavelength of the visible light as being distinct even if the illuminating light is received from the planarly light-emitting portion. It is possible to restrain a complicated impression from being given to the occupant.

A plurality of embodiments will be described below based on the drawings. Note that, by designating the components corresponding to each other in the individual embodiments by the same reference numerals, a repeated description thereof may be omitted. When only a part of a configuration is described in each of the embodiments, to the other part of the configuration, the configuration of the other previously described embodiment is applicable. Not only the configurations clearly shown in the description of the embodiments can be combined, but also the configurations of the plurality of embodiments, which are not clearly shown, can partially be combined unless the resulting combination presents a particular problem.

First Embodiment

A vehicular display device 100 according to a first embodiment is to be mounted on a vehicle and is placed at an instrument panel facing a seat where an occupant as a viewer sits. As illustrated in FIG. 1, the vehicular display device 100 is configured as a combination meter of analog display using indexes 22a and 22b pointed by pointers 40a and 40b and digital display using images displayed on an image indicator 10 and displays information toward a viewing side. An occupant is positioned at the viewing side of the vehicular display device 100 and can sense the displayed information. The displayed information includes vehicle states such as vehicle speed, engine speed, fuel level, coolant temperature, current values of an electric motor, and vehicle anomalies, for example. The other displayed information includes warning, road information, visibility assisting information, and electronic mail, for example.

Figure 2:
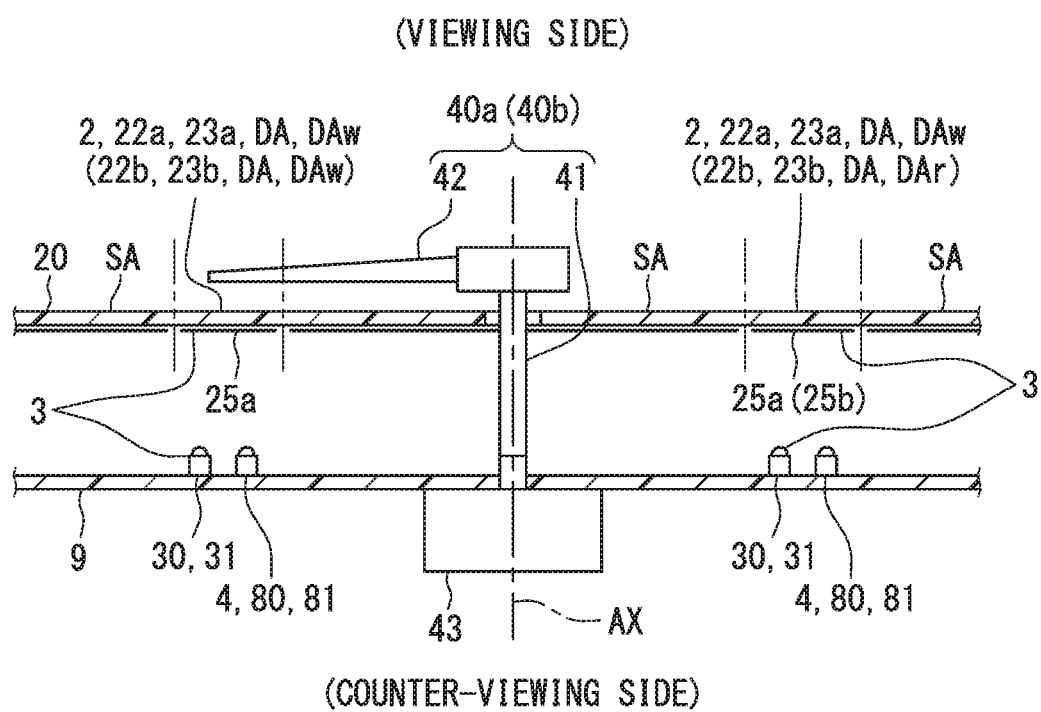
FIG. 2 is a sectional view illustrating placement of a near-infrared irradiation portion according to the first embodiment.
Figure 3:
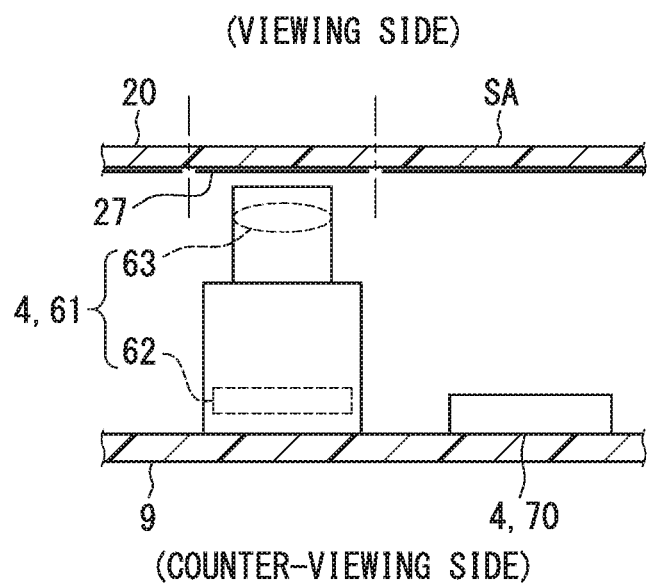
FIG. 3 is a sectional view illustrating the placement of an imaging portion and the like according to the first embodiment.

As illustrated in FIGS. 2 and 3, the vehicular display device 100 is configured as an integrated device formed integrally with an imaging system 4 to be described later.

The vehicular display device 100 includes the image indicator 10, a display plate 20, a visible light source portion 30, the pointers 40a and 40b, an imaging portion 60, an image processing portion 70, a near-infrared irradiation portion 80, and the like.

As illustrated in FIG. 1, the image indicator 10 is placed approximately at the center of the device 100. The image indicator 10 according to the present embodiment is provided as a transmissive liquid crystal panel using a thin film transistor (TFT) and is configured as a liquid crystal indicator using an active matrix liquid crystal panel formed by a plurality of two-dimensionally arrayed liquid crystal pixels. The image indicator 10 can display an image on a rectangular display screen 11. The image indicator 10 may use an organic EL display other than the liquid crystal indicator.

The display plate 20 is generally referred to as a dial plate and is flat formed by partially or overall applying semi-translucent or lightproof printing to the surface of a translucent base material made of synthetic resin such as polycarbonate resin or acrylic resin. Painting may replace printing. An optical resin or an optical filter material to transmit the near-infrared light may be attached to and held by the display plate 20.

As illustrated in FIGS. 1 through 3, the display plate 20 is placed toward the viewing side away from the image indicator 10. An aperture hole 21 is provided at a position where the display plate 20 overlaps with the image indicator 10 so that an image on the display screen 11 is displayed to the viewing side without being hidden by the display plate 20. The indexes 22a and 22b indicated by the pointers 40a and 40b are formed in the right and left regions of the aperture hole 21 on the display plate 20. The visible light source portion 30 illuminates the indexes 22a and 22b on the display plate 20 from a side (hereinafter referred to as a counter-viewing side) opposite the viewing side.

The visible light source portion 30 is placed toward the counter-viewing side away from the display plate 20 and includes a plurality of display light-emitting elements 31 that emit the visible display light. Each display light-emitting element 31 is provided by a light-emitting diode, for example. Each display light-emitting element 31 is mounted on the viewing side of a substrate 9. The substrate 9 is placed at the counter-viewing side away from the display plate 20 and is formed flat. Each display light-emitting element 31 is connected to a power supply via a conductive pattern on the substrate 9 and emits the visible display light toward the display plate 20. The present embodiment uses the white light as the visible display light emitted from each display light-emitting element 31. The white light is provided by the light widely scattered over a range corresponding to a wavelength of 400 through 800 nm.

The above-described printing forms a lightproof region SA and a display region DA on the display plate 20. The lightproof region SA occupies a large area of the display plate 20. The lightproof region SA is printed in a dark color (such as black) to be lightproof and thereby blocks the visible display light from the counter-viewing side. Semi-translucent printing or no printing is applied to the display region DA. Therefore, the display region DA transmits the visible display light from the counter-viewing side to the viewing side. The occupant visually recognizes that the visible display light is illuminated to activate the display. The display region DA is also referred to as a transmissive region.

As illustrated in FIGS. 1 and 2, a plurality of the pointers 40a and 40b are correspondingly provided for the right and left regions of the display plate 20. Particularly, the present embodiment provides each one of the pointers 40a and 40b for each one of the right and left regions. The pointers 40a and 40b each include a connecting portion 41 and an indicating portion 42 integrally. The connecting portion 41 is placed at the counter-viewing side away from the display plate 20 and is connected to the rotary shaft of a stepping motor 43 supported on the planar substrate 9. The indicating portion 42 is placed at the viewing side away from the display plate 20 and is shaped like a needle. The pointers 40a and 40b each rotate around a pointer shaft AX according to output from the stepping motor 43 and indicate the corresponding indexes 22a and 22b to display information corresponding to the indicated position.

On the display plate according to the present embodiment, the pointer 40a in the left region indicates the index 22a that represents a vehicle speed. The index 22a includes a pair of a scale index 23a and a letter index 24a. The scale index 23a is configured so that a scale is placed along a partial circle around the pointer shaft AX and the lightproof region SA surrounds the display region DA to form an outline of the display region DA. The letter index 24a is configured so that letters shaped into numerals correspond to the scale index 23a and the lightproof region SA surrounds the display region DA to form an outline of the display region DA. The numerals for the letter index 24a represent a vehicle speed in increments of 20 km/h. A white semi-translucent filter layer 25a is printed all over the display region DA to form the scale index 23a and the letter index 24a. Accordingly, the display region DA is provided as a white display region DAw that emits the white light from the visible light source portion 30 as the white light in an almost unchanged color to the viewing side. In more detail, the white filter layer 25a is formed to evenly transmit the light having different wavelengths ranging from the visible light to the near-infrared light.

On the display plate 20 according to the present embodiment, the pointer 40b in the right region indicates the index 22b that represents an engine speed. The index 22b includes a pair of a scale index 23b and a letter index 24b. The scale index 23b is configured so that a scale is placed along a partial circle around the pointer shaft AX and the lightproof region SA surrounds the display region DA to form an outline of the display region DA. The letter index 24b is configured so that letters shaped into numerals correspond to the scale index 23b and the lightproof region SA surrounds the display region DA to form an outline of the display region DA. The numerals for the letter index 24b represent an engine speed in increments of 1000 r/min. Part of the display region DA forming the scale index 23b indicates a value corresponding to a high engine speed (such as 5500 r/min) and is printed with a red-oriented semi-translucent filter layer 25b. Accordingly, the display region DA is provided as a red-oriented display region DAr that converts the white light from the visible light source portion 30 into the red-oriented light and emits the converted light to the viewing side. In more detail, the red-oriented filter layer 25b is formed to block out the visible light having wavelengths shorter than the wavelength of the red-oriented light and evenly transmit the light having different wavelengths ranging from the red-oriented light to the near-infrared light.

The red-oriented color according to the present embodiment is defined as a generic term for colors such as red and orange. The red-oriented light is defined as a generic term for red light (having a wavelength of 620 through 750 nm), orange light (having a wavelength of 590 through 630 nm), and the light having a mixture of the red light and the orange light to be recognized as the red light or the orange light. The red-oriented display region DAr according to the present embodiment emits the red light.

The display region DA to form the scale index 23b and the letter index 24b except for the red-oriented display region DAr provides the white display region DAw similar to the above-described white display region.

As above, the visible light source portion 30 and the display plate 20 configure a light-emitting display portion 2 that displays information by emitting the visible display light.

The imaging portion 60, the image processing portion 70, and the near-infrared irradiation portion 80 are placed inside the vehicular display device 100 and configure the imaging system 4 that images imaging targets in a vehicle. According to the present embodiment, the imaging target signifies the face of an occupant or, more particularly, a driver of the vehicle. The imaging system 4 images the driver face and processes the image and is thereby used for a driver status monitor (DSM) that monitors the driver for drowsy driving or inattentive driving.

As illustrated in FIG. 3, the imaging portion 60 images an imaging target illuminated by the near-infrared irradiation portion 80. Specifically, the imaging portion 60 includes a camera 61 placed next to the image indicator 10 at the counter-viewing side away from the display plate 20. Part of the display plate 20 facing the camera 61 provides a near-infrared light transmitting region TAir including a near-infrared light transmitting filter layer 27 that is printed to transmit the near-infrared light including the light having the upper-bound wavelength of the visible light. The light having the upper-bound wavelength of the visible light (hereinafter referred to as the upper-bound visible light) signifies the light having a wavelength of 780 through 830 nm approximate to the upper bound visible to the human eye.

The camera 61 includes a detection element 62 and a lens 63 to form an imaging target on the detection element 62. For example, the detection element 62 uses a CMOS sensor or a comparable element that features excellent sensitivity ranging from the visible light to the upper-bound visible light (including the near-infrared light) and ensures high resolution for detected images.

The image processing portion 70 is embodied as a functional block mainly provided by an electronic circuit including at least one processor, memory, and input/output interface mounted on the substrate 9. The processor can perform image processing by executing a computer program stored in the memory based on a signal that is input via the input/output interface and is acquired from the detection element 62. In more detail, the image processing portion 70 generates image data representing the imaged imaging target from a signal input from the detection element 62. The generated image data may be directly output to a vehicular ECU (Electric Control Unit) outside the vehicular display device and may be analyzed in the ECU. Alternatively, the image processing portion 70 may analyze the image data and determine whether the driver tends toward drowsy driving or inattentive driving.

As illustrated in FIG. 2, the near-infrared irradiation portion 80 emits the near-infrared light including the upper-bound visible light to the viewing side. The near-infrared irradiation portion 80 according to the present embodiment includes a plurality of near-infrared light-emitting elements 81 mounted on the viewing side of the substrate 9 so as to be placed adjacently to the display light-emitting elements 31 of the visible light source portion 30. A light-emitting diode is used for each near-infrared light-emitting element 81, for example. Each near-infrared light-emitting element 81 is connected to a power supply via the conductive pattern on the substrate 9 and emits the near-infrared light including the upper-bound visible light to the display plate 20. The near-infrared light-emitting element 81 according to the present embodiment features wavelength characteristics indicating a peak wavelength of 850 nm and a half-value width of 30 through 40 nm, for example. The total light intensity generated by the near-infrared light-emitting elements 81 is set to be smaller than the total light intensity generated by the display light-emitting elements 31.

The display light-emitting element 31 and the near-infrared light-emitting element 81 are placed in the common space adjacently to each other. Accordingly, both the visible display light and the near-infrared light including the upper-bound visible light enter each display region DA of the display plate 20 from the counter-viewing side.

Figure 4:
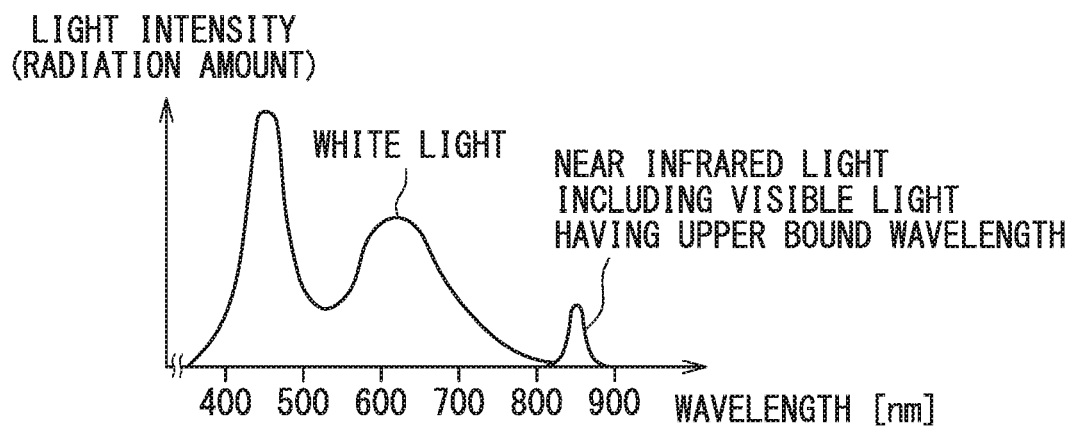
FIG. 4 is a spectral distribution chart illustrating the light as a mixture of the near-infrared light including the light having the upper-bound wavelength of the visible light and the white light as visible display light.

As illustrated in FIG. 4, each white display region DAw emits the white light as the visible display light mixed with the near-infrared light including the upper-bound visible light. Of the light emitted from each white display region DAw, a ratio of the upper-bound visible light is adjusted to be sufficiently smaller than a ratio of the white light as the visible display light. Therefore, the occupant can recognize a mixture of the near-infrared light including the upper-bound visible light and the white light as the visible display light, if any, as white instead of pink.

Each red-oriented display region DAr emits the red-oriented light as the visible display light mixed with the near-infrared light including the upper-bound visible light. The upper-bound visible light and the red-oriented light as the visible display light belong to similar hues. The occupant hardly recognizes the upper-bound visible light, if mixed, as being distinct.

The white display region DAw and the red-oriented display region DAr form the indexes 22a and 22b indicated by the pointers 40a and 40b. The face of a driver is naturally illuminated when visually recognizing the indexes 22a and 22b. In addition, the driver cannot recognize the upper-bound visible light as being distinct and can hardly notice that the face of the driver is illuminated for imaging.

The light emitted from the near-infrared irradiation portion 80 includes the upper-bound visible light that is likely to be visually recognized and is disguised (camouflaged) so as to be restrained from being recognized as being distinct. According to the present embodiment, the visible light source portion 30 includes the near-infrared light-emitting element 81 and the display light-emitting element 31 adjacent to each other in the common space. The display plate 20 includes the white display region DAw and the red-oriented display region DAr. The visible light source portion 30 and the display plate 20 function as a disguise portion 3 that disguises the upper-bound visible light emitted to the viewing side.

(Operation and Effect)

The description below explains the operation and the effect of the above-described first embodiment.

The vehicular display device according to the first embodiment allows the disguise portion 3 to disguise the upper-bound visible light. When the near-infrared irradiation portion 80 emits the near-infrared light including the upper-bound visible light to the viewing side, it is difficult for the occupant to distinctly recognize the disguised upper-bound visible light. As a result, it is possible to suppress a complicated impression when the displayed information is visually recognized.

According to the first embodiment, the disguise portion 3 disguises the light having the upper-bound wavelength of the visible light by mixing the upper-bound visible light with the visible light having a wavelength different from the wavelength of the upper-bound visible light. The color mixture prevents the color of the upper-bound visible light from being distinct, making it difficult for the occupant to distinctly recognize the presence of the upper-bound visible light. Therefore, it is possible to reliably suppress the complicated impression.

According to the first embodiment, the light-emitting display portion 2 emits the visible display light mixed with the near-infrared light including the upper-bound visible light emitted from the near-infrared irradiation portion 80. The upper-bound visible light is mixed with the visible display light emitted from the light-emitting display portion 2. Therefore, it is difficult for the occupant to distinctly recognize the presence of the upper-bound visible light. Therefore, it is possible to reliably suppress the complicated impression.

According to the first embodiment, the light-emitting display portion 2 includes the red-oriented display region DAr to emit the red-oriented light as the visible display light. The light-emitting display portion 2 emits the red-oriented light mixed with the near-infrared light including the upper-bound visible light emitted by the near-infrared irradiation portion 80 from the red-oriented display region DAr. Namely, the upper-bound visible light is disguised by being mixed with the red-oriented light emitted from the red-oriented display region DAr. The upper-bound visible light and the red-oriented light belong to similar hues, making it very difficult to distinctly recognize the presence of the upper-bound visible light. The effect of suppressing the complicated impression is extraordinary.

According to the first embodiment, the white display region DAw emits the white light that indicates the light intensity higher than the upper-bound visible light and is mixed with the near-infrared light including the upper-bound visible light emitted from the near-infrared irradiation portion 80. The upper-bound visible light is disguised by being mixed with the white light emitted from the white display region DAw. The light intensity of the white light is higher than that of the upper-bound visible light. The occupant can recognize white instead of pink when viewing a mixture with the white light as the visible display light if any. The occupant can hardly identify the presence of the upper-bound visible light when visually recognizing the information displayed by the light-emitting display portion 2. Therefore, it is possible to reliably suppress the complicated impression.

According to the first embodiment, the light-emitting display portion 2 includes the near-infrared irradiation portion 80 at the visible light source portion 30. The display region DA of the display plate 20 transmits the near-infrared light including the upper-bound visible light emitted by the near-infrared irradiation portion 80 to the viewing side. In this manner, the upper-bound visible light is reliably mixed with the visible display light emitted from the transmissive region. It is very difficult for the occupant to distinctly recognize the presence of the upper-bound visible light even when the occupant visually recognizes the information displayed by the light-emitting display portion 2. In addition, the upper-bound visible light can be reliably emitted to the viewing side.

The first embodiment moreover includes the imaging portion 60 that images an imaging target illuminated by the near-infrared irradiation portion 80. The imaging portion 60 can sense the upper-bound visible light that is disguised to reduce a complicated impression and illuminates an imaging target to be imaged. It is possible to not only suppress a complicated impression on the vehicular display device 100 but also suppress a decrease in the imaging quality.

The imaging system 4 according to the first embodiment allows the disguise portion 3 to disguise the upper-bound visible light. It is difficult for the occupant to distinctly identify the disguised light having the upper-bound wavelength of the visible light even if the near-infrared irradiation portion 80 emits the near-infrared light including the light having the upper-bound wavelength of the visible light to the viewing side. As a result, it is possible to suppress a complicated impression received by the vehicle occupant who visually recognizes the displayed information.

The imaging portion 60 can sense the upper-bound visible light that is disguised to reduce a complicated impression and illuminates an imaging target to be imaged. It is possible to suppress a decrease in the imaging quality.

Second Embodiment

As illustrated in FIGS. 5 through 9, a second embodiment is a modification of the first embodiment. The description below explains the second embodiment mainly in terms of differences from the first embodiment.

A vehicular display device 200 according to the second embodiment can display levels of the fuel efficiency in the vehicle. Specifically, as illustrated in FIG. 5, a display plate 220 includes a fuel-economy indicating lamp 226 configured by outlining the display region DA that is shaped into letters "ECO" and is surrounded by the lightproof region SA.

Figure 6:
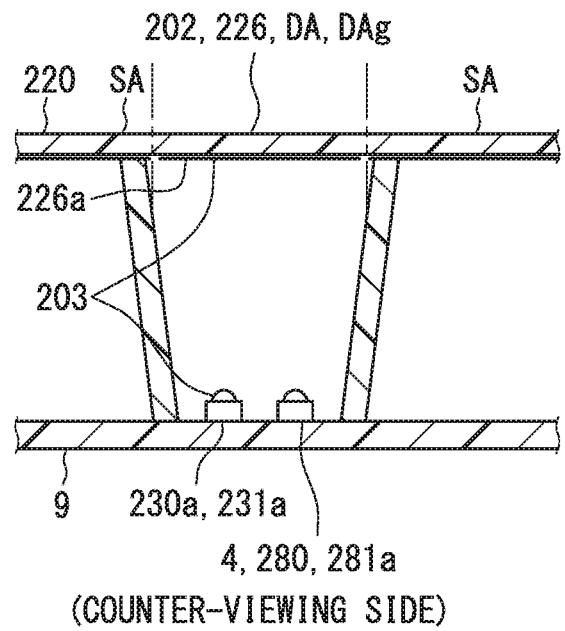
FIG. 6 is a sectional view illustrating placement of a near-infrared irradiation portion and the like, particularly a part corresponding to a fuel-economy indicating lamp according to the second embodiment.

As illustrated in FIG. 6, a fuel-economy visible light source portion 230a is placed toward the counter-viewing side away from the fuel-economy indicating lamp 226 of the display plate 220. The fuel-economy visible light source portion 230a includes a display light-emitting element 231a to emit the visible display light. Similarly to the visible light source portion 30 according to the first embodiment, the display light-emitting element 231a uses a light-emitting diode, for example. However, the display light-emitting element 231a emits the light having a yellow-green wavelength as the visible display light that has the peak wavelength of approximately 560 nm and is visually recognized as being green, yellow-green, or green.

The whole of the display region DA to form the fuel-economy indicating lamp 226 includes a semi-translucent smoke layer 226a produced by smoke printing. The display region DA thereby provides a yellow-green display region DAg that emits the light having a yellow-green wavelength from the fuel-economy visible light source portion 230a to the viewing side without almost changing the color of the light having a yellow-green wavelength. When the fuel efficiency goes to be greater than or equal to a predetermined value, the fuel-economy indicating lamp 226 activates the display by turning on the display light-emitting element 231a of the fuel-economy visible light source portion 230a. When the fuel efficiency goes to be smaller than a predetermined value, the fuel-economy indicating lamp 226 inactivates the display by turning off the display light-emitting element 231a.

Figure 5:
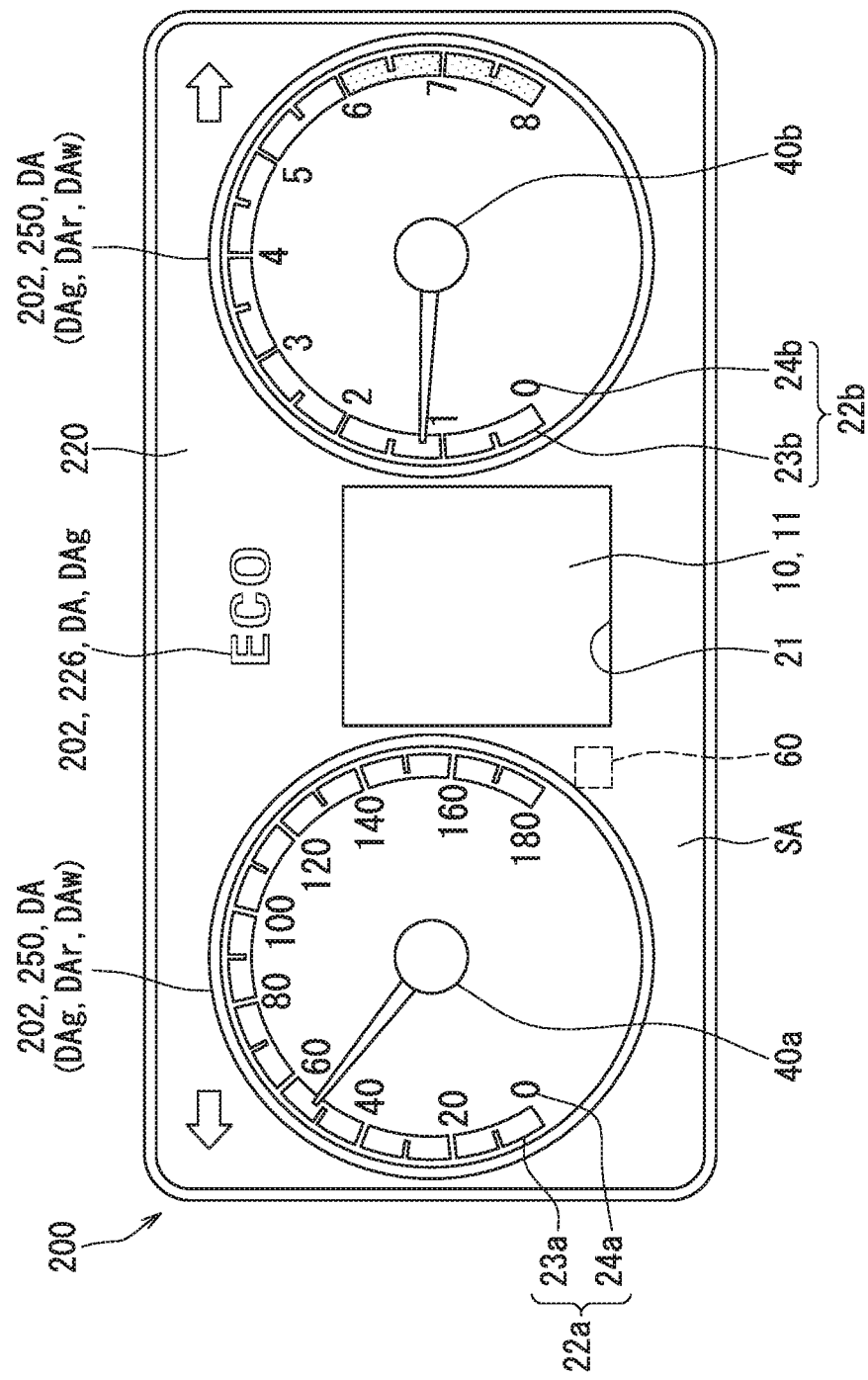
FIG. 5 is a front view illustrating a vehicular display device according to a second embodiment.
Figure 7:
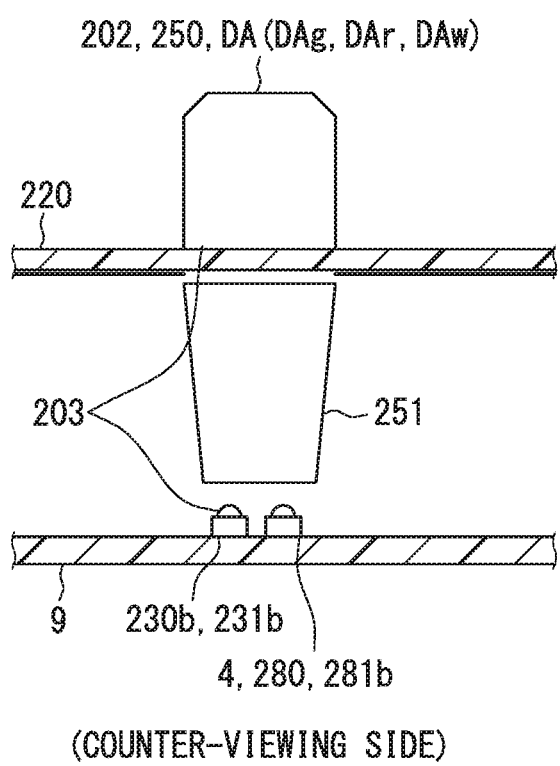
FIG. 7 is a sectional view illustrating placement of the near-infrared irradiation portion and the like, particularly a part corresponding to a light-emitting ring according to the second embodiment.

As illustrated in FIG. 5, the second embodiment provides an annularly shaped light-emitting ring 250 protruding from the display plate 220 around a range of rotationally moving each of the pointers 40a and 40b. As illustrated in FIG. 7, a ring-use visible light source portion 230b is placed at the counter-viewing side away from the light-emitting ring 250. The ring-use visible light source portion 230b includes a plurality of display light-emitting elements 231b to emit the visible display light. Similarly to the fuel-economy visible light source portion 230a, each display light-emitting element 231b uses a light-emitting diode, for example. The display light-emitting element 231b uses a multi-color light-emitting element (a 3in1 light-emitting element) capable of changing colors.

The visible display light from each display light-emitting element 231b is guided into a light guiding member 251, passes through a non-printing region of the display plate 220, and evenly enters the whole circumference of the light-emitting ring 250. The light-emitting ring 250 configures the display region DA that emits the visible display light to the viewing side.

The light-emitting ring 250 changes the color depending on the luminescent color of the ring-use visible light source portion 230b. When the fuel efficiency changes to a predetermined value or more, for example, the light-emitting ring 250 changes to the yellow-green display region DAg that emits the light having a yellow-green wavelength as the visible display light. When the fuel efficiency changes to be smaller than the predetermined value, for example, the light-emitting ring 250 changes to the red-oriented display region DAr that emits the red-oriented light as the visible display light. The light-emitting ring 250 can change to the white display region DAw emitting the white light or a blue display region emitting the blue light.

The fuel-economy visible light source portion 230a, the ring-use visible light source portion 230b, the display plate 220, and the light-emitting ring 250 configure a light-emitting display portion 202 that displays information by emitting the visible display light.

The near-infrared irradiation portion 280 according to the second embodiment includes a near-infrared light-emitting element 281a and a near-infrared light-emitting element 281b. The near-infrared light-emitting element 281a is placed adjacently to the display light-emitting element 231a of the fuel-economy visible light source portion 230a. The near-infrared light-emitting element 281b is placed adjacently to the display light-emitting element 231b of the ring-use visible light source portion 230b.

Figure 8:
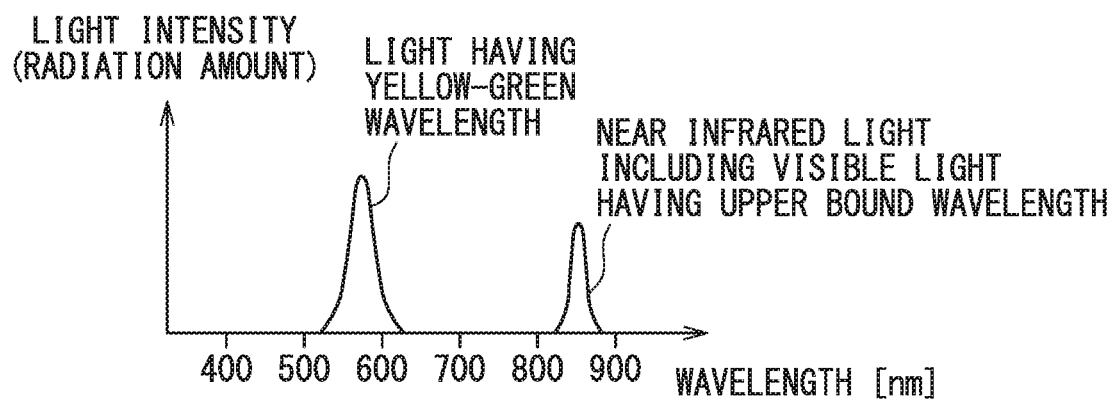
FIG. 8 is a spectral distribution chart illustrating the light as a mixture of the near-infrared light including the light having the upper-bound wavelength of the visible light and the light having a yellow-green wavelength as visible display light.
Figure 9:
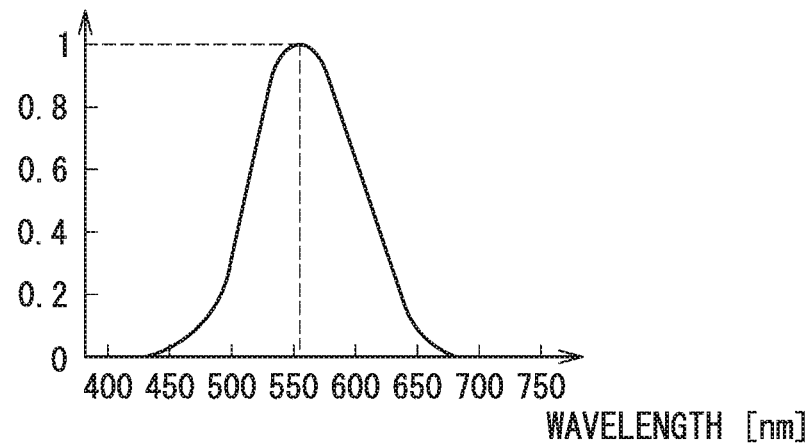
FIG. 9 is a graph illustrating a relative spectral sensitivity curve to explain the second embodiment.

While the fuel-economy indicating lamp 226 enters a display state, the yellow-green display region DAg to form the fuel-economy indicating lamp 226 emits the light having a yellow-green wavelength as the visible display light mixed with the near-infrared light including the upper-bound visible light as illustrated in FIG. 8. The near-infrared light including the upper-bound visible light indicates the relative spectral sensitivity of 0.2 or lower. The light having a yellow-green wavelength as the visible display light indicates the relative spectral sensitivity approximate to 1 (see FIG. 9). It is almost difficult for the occupant to distinctly recognize the upper-bound visible light if mixed.

When changed to the yellow-green display region DAg, the light-emitting ring 250 emits the light having a yellow-green wavelength as the visible display light mixed with the near-infrared light including the upper-bound visible light. Similarly to the fuel-economy indicating lamp 226, the light-emitting ring 250 also makes it difficult for the occupant to distinctly recognize the upper-bound visible light.

When changed to the red-oriented display region DAr, the light-emitting ring 250 emits the red-oriented light as the visible display light mixed with the near-infrared light including the upper-bound visible light. Similarly to the red-oriented display region DAr according to the first embodiment, the light-emitting ring 250 also makes it difficult for the occupant to distinctly recognize the upper-bound visible light.

The upper-bound visible light included in the light emitted from the near-infrared irradiation portion 280 is likely to be visually recognized and is disguised and thereby restrained from being recognized as being distinctly present. According to the second embodiment, the fuel-economy visible light source portion 230a and the ring-use visible light source portion 230b including the display light-emitting elements 231a and 231b, which are placed with the display light-emitting elements 231a and 231b in the common space, placed adjacently to each other, the display plate 220 including the yellow-green display region DAg, and the light-emitting ring 250 interchangeably provided with the display regions DA corresponding to the respective colors function as a disguise portion 203 that disguises the upper-bound visible light.

According to the above-described second embodiment, the light-emitting display portion 202 includes the yellow-green display region DAg that emits the light having a yellow-green wavelength as the visible display light. The yellow-green display region DAg emits the light having a yellow-green wavelength mixed with the near-infrared light including the upper-bound visible light emitted from the near-infrared irradiation portion 280. Of the visible light, the light having a yellow-green wavelength has a particularly high relative spectral sensitivity. However, the upper-bound visible light has a very low relative spectral sensitivity. The remarkable difference between the relative spectral sensitivities makes it very difficult to distinctly recognize the presence of the upper-bound visible light. Therefore, the effect of suppressing the complicated impression is extraordinary.

Third Embodiment

Figure 10:
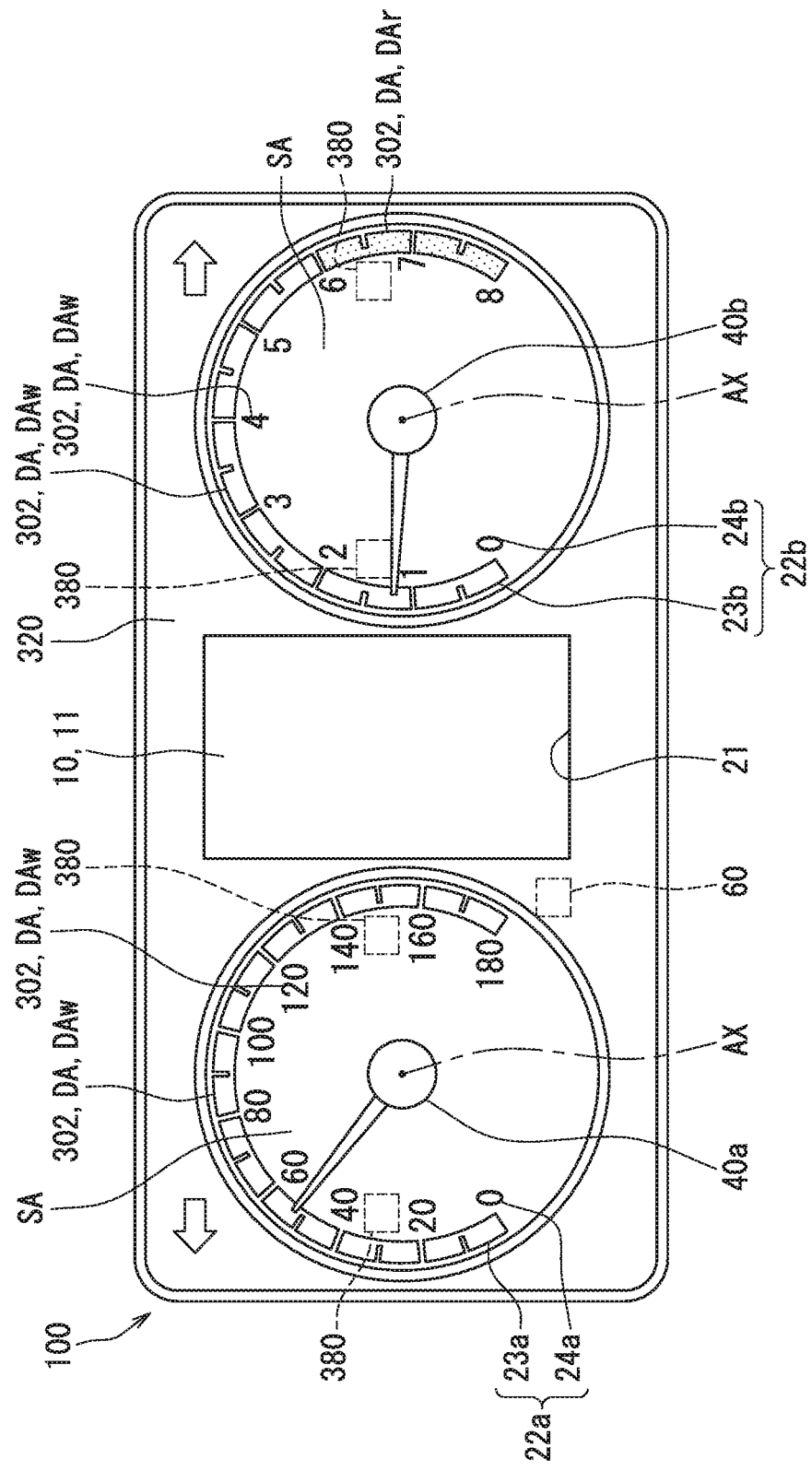
FIG. 10 is a front view illustrating a vehicular display device according to a third embodiment.
Figure 11:
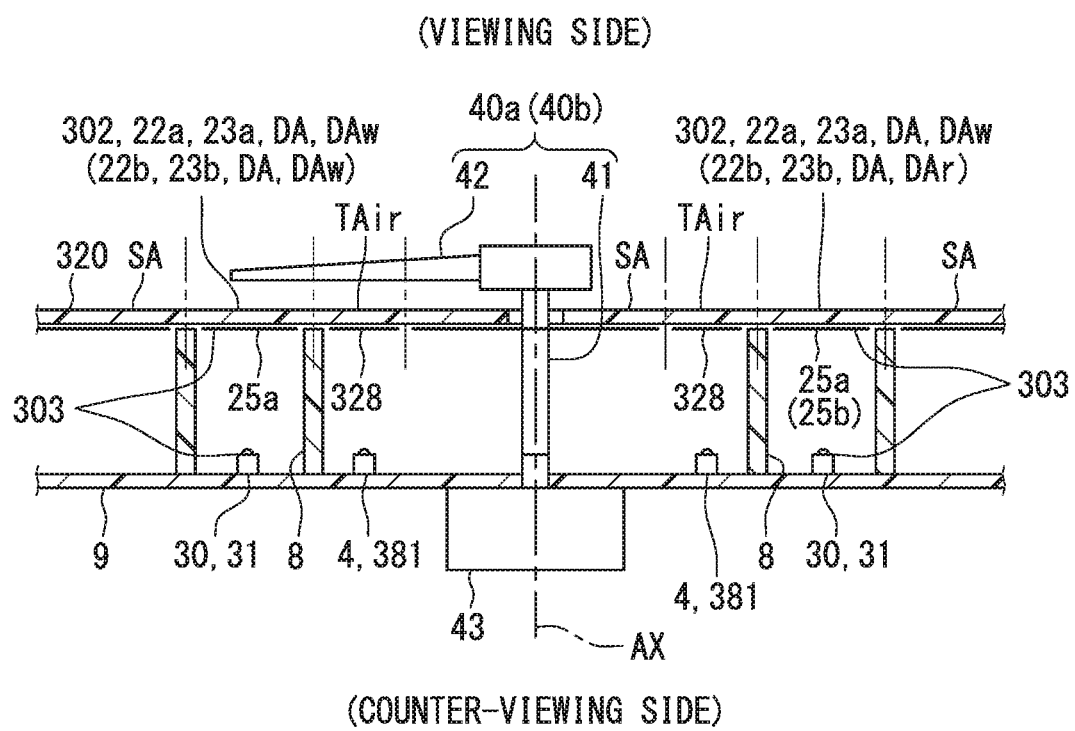
FIG. 11 is a sectional view illustrating placement of a near-infrared irradiation portion according to the third embodiment.

As illustrated in FIGS. 10 and 11, a third embodiment is a modification of the first embodiment. The description below explains the third embodiment mainly in terms of differences from the first embodiment.

Unlike the first embodiment, a near-infrared irradiation portion 380 according to the third embodiment is not provided for the visible light source portion 30. The near-infrared irradiation portion 380 according to the third embodiment includes a near-infrared light-emitting element 381 that is placed at the counter-viewing side away from a display plate 320 in a space separated from the space to place the visible light source portion 30 across a lightproof wall 8.

The display plate 320 forms the near-infrared light transmitting region TAir printed with a near-infrared light transmitting filter layer 328 that is positioned adjacently to the indexes 22a and 22b forming the white display region DAw or the red-oriented display region DAr and transmits the near-infrared light including the upper-bound visible light. The near-infrared light transmitting region TAir functions as part of the near-infrared irradiation portion 380. The near-infrared light transmitting region TAir transmits the near-infrared light to the viewing side. In this case, the near-infrared light includes the upper-bound visible light that enters the display plate 320 from the near-infrared light-emitting element 381 at the counter-viewing side.

The near-infrared light transmitting region TAir of the near-infrared irradiation portion 380 is placed adjacently to the white display region DAw or the red-oriented display region DAr of the light-emitting display portion 302. The noticeability makes it difficult to distinctly recognize that the near-infrared irradiation portion 380 emits the upper-bound visible light.

The upper-bound visible light included in the light emitted from the near-infrared irradiation portion 380 is likely to be visually recognized and is disguised and thereby restrained from being recognized as being distinctly present. According to the third embodiment, the visible light source portion 30 and the display plate 320 including the white display region DAw and the red-oriented display region DAr function as a disguise portion 303 that disguises the upper-bound visible light.

According to the above-described third embodiment, the light-emitting display portion 302 is placed adjacently to the near-infrared irradiation portion 380. The upper-bound visible light is disguised by the visible display light that is emitted from the adjacent position. The upper-bound visible light is less distinct than separately placing the near-infrared irradiation portion 380. It is difficult for the occupant to distinctly recognize the upper-bound visible light. As a result, it is possible to suppress a complicated impression received by the vehicle occupant who visually recognizes the displayed information.

According to the above-described third embodiment, the red-oriented display region DAr is placed adjacently to the near-infrared irradiation portion 380. The upper-bound visible light is disguised by the red-oriented light that is emitted from the adjacent position. The upper-bound visible light and the red-oriented light belong to similar hues. The upper-bound visible light is definitely less distinct than separately placing the near-infrared irradiation portion 380. It is more difficult for the occupant to distinctly recognize the upper-bound visible light. As a result, it is possible to suppress a complicated impression received by the vehicle occupant who visually recognizes the displayed information.

Fourth Embodiment

Figure 12:
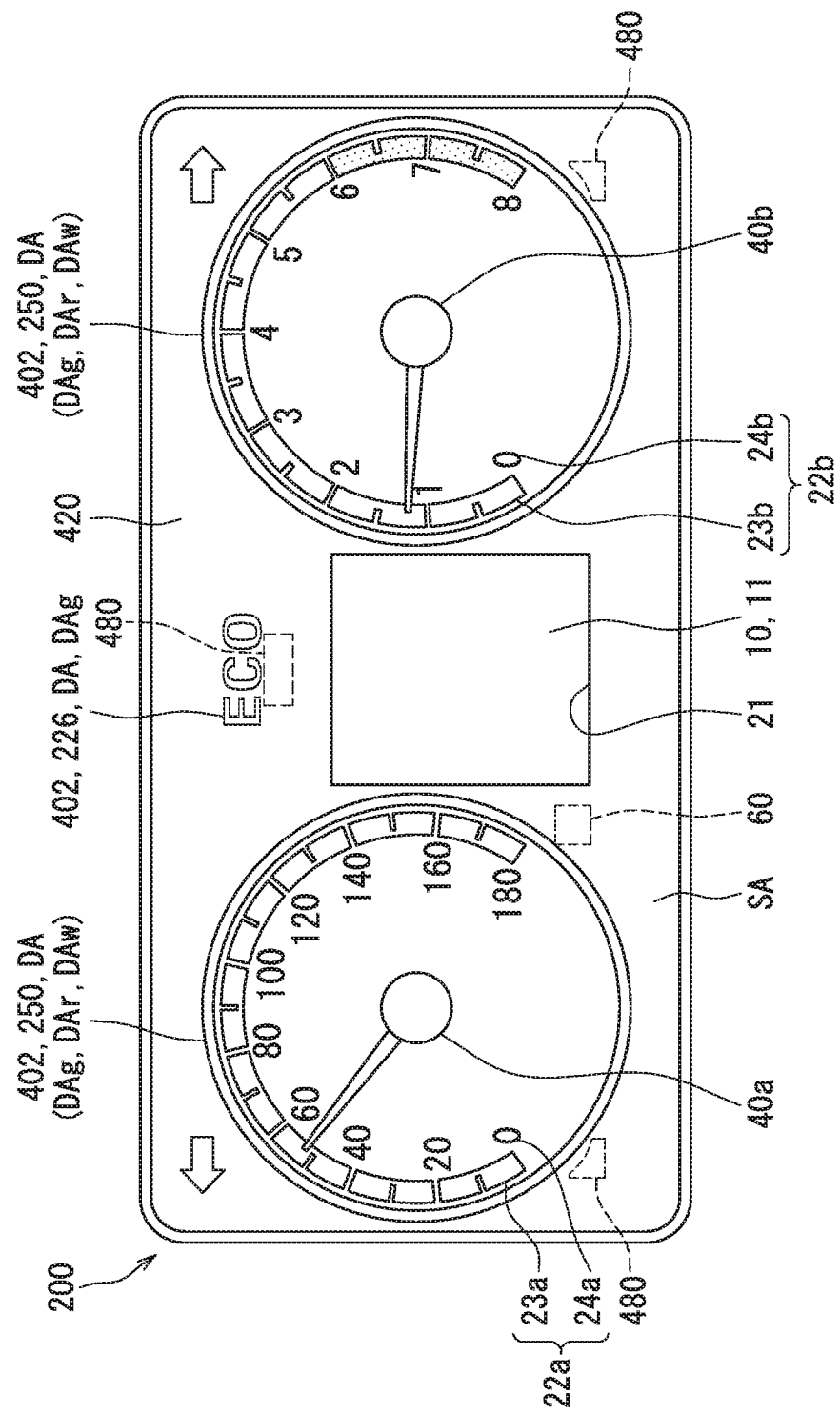
FIG. 12 is a front view illustrating a vehicular display device according to a fourth embodiment.
Figure 13:
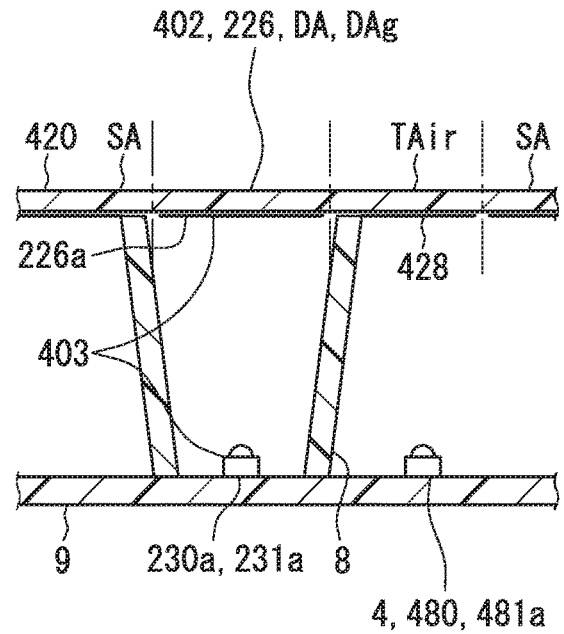
FIG. 13 is a sectional view illustrating placement of a near-infrared irradiation portion and the like, particularly a part corresponding to a fuel-economy indicating lamp according to the fourth embodiment.
Figure 14:
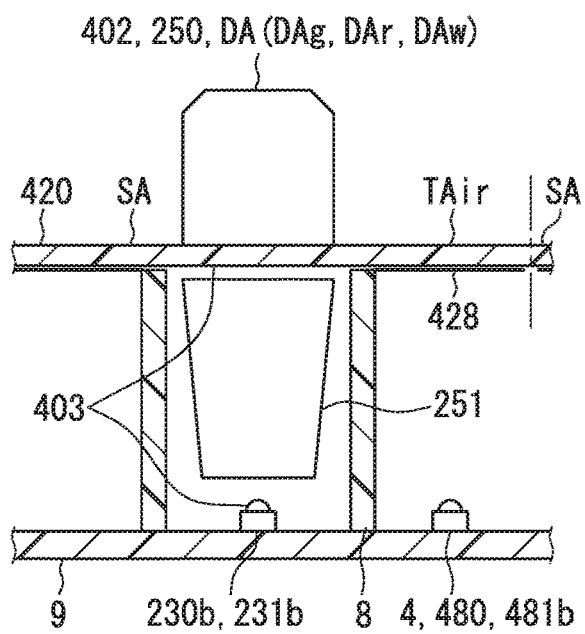
FIG. 14 is a sectional view illustrating placement of the near-infrared irradiation portion and the like, particularly a part corresponding to a light-emitting ring according to the fourth embodiment.

As illustrated in FIGS. 12 through 14, a fourth embodiment is a modification of the second embodiment. The description below explains the fourth embodiment mainly in terms of differences from the second embodiment.

Unlike the second embodiment, a near-infrared irradiation portion 480 according to the fourth embodiment is not placed at the fuel-economy visible light source portion 230a and the ring-use visible light source portion 230b. The near-infrared irradiation portion 480 according to the fourth embodiment includes a near-infrared light-emitting element 481a that is placed at the counter-viewing side away from a display plate 420 in a space separated from the space to place the fuel-economy visible light source portion 230a across the lightproof wall 8.

The display plate 420 forms the near-infrared light transmitting region TAir printed with a near-infrared light transmitting filter layer 428 that is positioned adjacently to the fuel-economy indicating lamp 226 forming the yellow-green display region DAg and transmits the near-infrared light including the upper-bound visible light. The near-infrared light transmitting region TAir functions as part of the near-infrared irradiation portion 480. The near-infrared light transmitting region TAir transmits the near-infrared light to the viewing side. In this case, the near-infrared light includes the upper-bound visible light that enters the display plate 420 from the near-infrared light-emitting element 481a at the counter-viewing side.

The near-infrared light transmitting region TAir of the near-infrared irradiation portion 480 is placed adjacently to the fuel-economy indicating lamp 226 forming the yellow-green display region DAg of the light-emitting display portion 402. The near-infrared irradiation portion 480 emits the upper-bound visible light that is hardly identified distinctly while the fuel-economy indicating lamp 226 activates the display state.

The near-infrared irradiation portion 480 according to the fourth embodiment includes a near-infrared light-emitting element 481b that is placed at the counter-viewing side away from the display plate 420 in a space separated from the space to place the ring-use visible light source portion 230b across the lightproof wall 8.

The display plate 420 forms the near-infrared light transmitting region TAir printed with the near-infrared light transmitting filter layer 428 at a position adjacent to the light-emitting ring 250 that forms the yellow-green display region DAg and the red-oriented display region DAr to be able to change the colors. In this case, the near-infrared light transmitting filter layer 428 transmits the near-infrared light including the upper-bound visible light. The near-infrared light transmitting region TAir functions as part of the near-infrared irradiation portion 480. The near-infrared light transmitting region TAir transmits the near-infrared light to the viewing side. In this case, the near-infrared light includes the upper-bound visible light that enters the display plate 420 from the near-infrared light-emitting element 481b at the counter-viewing side.

The near-infrared light transmitting region TAir of the near-infrared irradiation portion 480 is placed adjacently to the light-emitting ring 250 that forms the yellow-green display region DAg and the red-oriented display region DAr of the light-emitting display portion 402 to be able to change the colors. The noticeability makes it difficult to distinctly recognize that the near-infrared irradiation portion 480 emits the upper-bound visible light.

The upper-bound visible light included in the light emitted from the near-infrared irradiation portion 480 is likely to be visually recognized and is disguised and thereby restrained from being recognized as being distinctly present. According to the fourth embodiment, the fuel-economy visible light source portion 230a, the ring-use visible light source portion 230b, the display plate 420 provided with the yellow-green display region DAg, and the light-emitting ring 250 provided with the display regions DA to be able to change the respective colors function as a disguise portion 403 that disguises the upper-bound visible light.

According to the above-described fourth embodiment, the yellow-green display region DAg is placed adjacently to the near-infrared irradiation portion 480. The upper-bound visible light is disguised by the light having a yellow-green wavelength emitted from the adjacent position. Of the visible light, the light having a yellow-green wavelength has a particularly high relative spectral sensitivity. However, the upper-bound visible light has a very low relative spectral sensitivity. The upper-bound visible light is definitely less distinct than separately placing the near-infrared irradiation portion 480. It is more difficult for the occupant to distinctly recognize the upper-bound visible light. As a result, it is possible to suppress a complicated impression received by the vehicle occupant who visually recognizes the displayed information.

Fifth Embodiment

Figure 15:
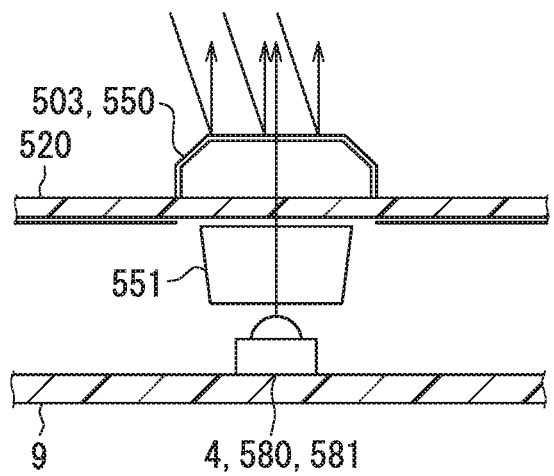
FIG. 15 is a sectional view illustrating placement of a near-infrared irradiation portion and the like according to a fifth embodiment.

As illustrated in FIG. 15, a fifth embodiment is a modification of the first embodiment. The description below explains the fifth embodiment mainly in terms of differences from the first embodiment.

The fifth embodiment provides an annularly shaped reflecting ring 550 protruding from a display plate 520 around a range of rotationally moving each of the pointers 40a and 40b. The reflecting ring 550 includes a very thin metallic thin film formed by plating or evaporating the metal such as tin or silver on the viewing side surface of a translucent base material made of a synthetic resin such as polycarbonate resin or acrylic resin. The reflecting ring 550 reflects the outside light entering from the viewing side to the viewing side again. In addition, the reflecting ring 550 is formed to be able to transmit the light from the counter-viewing side to the viewing side and functions as an outside light reflecting portion like a one-way mirror or a half mirror.

The outside light includes the sunlight entering a vehicle compartment through a windshield, the illuminating light from an interior light, and the display light emitted from a display screen for a car navigation system.

A near-infrared irradiation portion 580 includes a plurality of near-infrared light-emitting elements 581 placed on the counter-viewing side away from the reflecting ring 550. The near-infrared light including the upper-bound visible light from the near-infrared light-emitting element 581 is guided into a light guiding member 551, passes through a non-printing region of the display plate 520, and evenly enters the whole circumference of the reflecting ring 550.

The reflecting ring 550 transmits the near-infrared light including the upper-bound visible light emitted from the near-infrared irradiation portion 580 to the viewing side. The near-infrared light including the upper-bound visible light is mixed with the outside light reflected on the reflecting ring 550 and is emitted to the viewing side. Therefore, it is difficult for the occupant to distinctly recognize the upper-bound visible light.

The upper-bound visible light included in the light emitted from the near-infrared irradiation portion 580 is likely to be visually recognized and is disguised and thereby restrained from being recognized as being distinctly present.

According to the fifth embodiment, the reflecting ring 550 functions as a disguise portion 503 that disguises the upper-bound visible light.

According to the above-described fifth embodiment, the reflecting ring 550 as the outside light reflecting portion is placed at the viewing side away from the near-infrared irradiation portion 580. The reflecting ring 550 transmits the near-infrared light including the upper-bound visible light emitted from the near-infrared irradiation portion 580 and thereby reflects the outside light mixed with the near-infrared light including the upper-bound visible light to the viewing side. The upper-bound visible light passes through the reflecting ring 550 and is disguised by being mixed with the outside light reflecting on the reflecting ring 550. It is difficult for the occupant to distinctly recognize the presence of the upper-bound visible light even when visually recognizing the reflecting ring 550 along with the information displayed by the light-emitting display portion 2. Therefore, it is possible to suppress a complicated impression.

Sixth Embodiment

Figure 16:
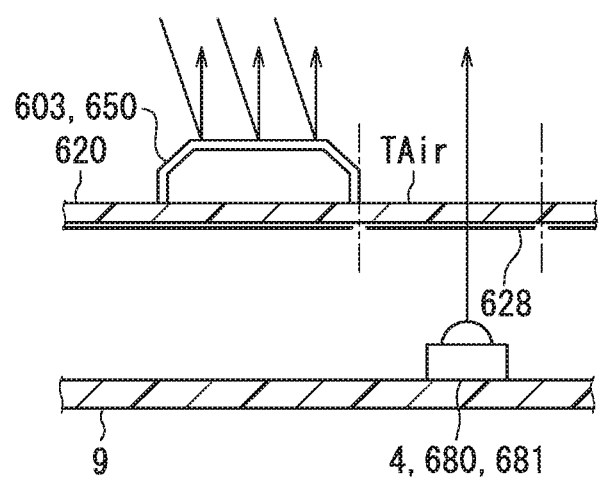
FIG. 16 is a sectional view illustrating placement of a near-infrared irradiation portion and the like according to a sixth embodiment.

As illustrated in FIG. 16, a sixth embodiment is a modification of the first embodiment. The description below explains the sixth embodiment mainly in terms of differences from the first embodiment.

The sixth embodiment provides an annularly shaped reflecting ring 650 protruding from a display plate 620 around a range of rotationally moving each of the pointers 40a and 40b. The reflecting ring 650 includes a metallic reflecting film formed by plating or evaporating the metal such as aluminum on the viewing side surface of a base material made of a synthetic resin. Unlike the reflecting ring 650 according to the fifth embodiment, the reflecting ring 650 is not formed to be able to transmit the light from the counter-viewing side to the viewing side but reflects the outside light entering from the viewing side to the viewing side again and functions as an outside light reflecting portion like a mirror.

The display plate 620 forms the near-infrared light transmitting region TAir printed with a near-infrared light transmitting filter layer 628 at a position adjacent to the reflecting ring 650. In this case, the near-infrared light transmitting filter layer 628 transmits the near-infrared light including the upper-bound visible light. A near-infrared irradiation portion 680 includes a near-infrared light-emitting element 681 placed at the counter-viewing side away from the near-infrared light transmitting region TAir.

The near-infrared light transmitting region TAir functioning as part of the near-infrared irradiation portion 680 transmits the near-infrared light to the viewing side. In this case, the near-infrared light includes the upper-bound visible light that enters the display plate 620 from the near-infrared light-emitting element 681 at the counter-viewing side.

The near-infrared light transmitting region TAir of the near-infrared irradiation portion 680 is placed adjacently to the reflecting ring 650 that reflects the outside light to the viewing side. The glare of the outside light makes it difficult to distinctly recognize that the near-infrared irradiation portion 680 emits the upper-bound visible light.

The upper-bound visible light included in the light emitted from the near-infrared irradiation portion 680 is likely to be visually recognized and is disguised and thereby restrained from being recognized as being distinctly present. According to the sixth embodiment, the reflecting ring 650 functions as a disguise portion 603 that disguises the upper-bound visible light.

According to the above-described sixth embodiment, the reflecting ring 650 as the outside light reflecting portion is placed adjacently to the near-infrared irradiation portion 680. The upper-bound visible light is disguised by the outside light reflected at the adjacent position. The upper-bound visible light is definitely less distinct than separately placing the near-infrared irradiation portion 680. It is more difficult for the occupant to distinctly recognize the upper-bound visible light. As a result, it is possible to suppress a complicated impression received by the vehicle occupant who visually recognizes the displayed information.

Seventh Embodiment

Figure 17:
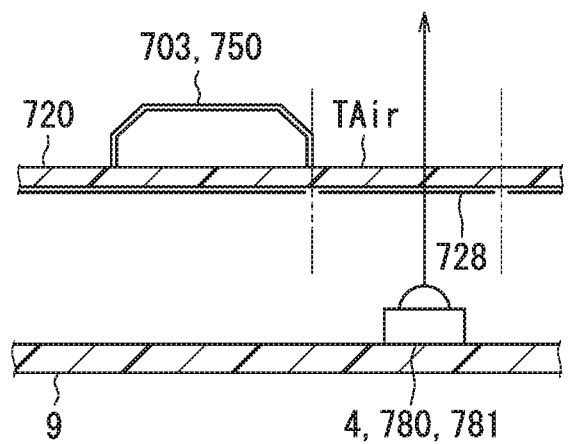
FIG. 17 is a sectional view illustrating placement of a near-infrared irradiation portion and the like according to a seventh embodiment.

As illustrated in FIG. 17, a seventh embodiment is a modification of the first embodiment. The description below explains the seventh embodiment mainly in terms of differences from the first embodiment.

The seventh embodiment provides a red-oriented ring 750 protruding from a display plate 720 around a range of rotationally moving each of the pointers 40a and 40b. For example, the red-oriented ring 750 includes a red-oriented layer generated by red-oriented lightproof printing on the viewing side surface of a base material made of synthetic resin. The red-oriented ring 750 functions as a red-oriented decoration portion that is formed to be red-oriented to decorate the information display provided by the pointers 40a and 40b and the light-emitting display portion 2. The red-oriented ring according to the present embodiment is formed to be red but may be formed to be orange.

The display plate 720 forms the near-infrared light transmitting region TAir including a near-infrared light transmitting filter layer 728 printed at the position adjacent to the red-oriented ring 750. In this case, the near-infrared light transmitting filter layer 728 transmits the near-infrared light including the upper-bound visible light. A near-infrared irradiation portion 780 includes a near-infrared light-emitting element 781 placed at the counter-viewing side away from the near-infrared light transmitting region TAir.

The near-infrared light transmitting region TAir functioning as part of the near-infrared irradiation portion 780 transmits the near-infrared light to the viewing side. In this case, the near-infrared light includes the upper-bound visible light entering the display plate 720 from the near-infrared light-emitting element 781 on the counter-viewing side.

The near-infrared light transmitting region TAir of the near-infrared irradiation portion 780 is placed adjacently to the red-oriented ring 750. The red-oriented ring has a hue similar to that of the upper-bound visible light and makes it difficult to distinctly recognize that the near-infrared irradiation portion 780 emits the upper-bound visible light.

The upper-bound visible light included in the light emitted from the near-infrared irradiation portion 780 is likely to be visually recognized and is disguised and thereby restrained from being recognized as being distinctly present. According to the seventh embodiment, the red-oriented ring 750 functions as a disguise portion 703 that disguises the upper-bound visible light.

According to the above-described seventh embodiment, the red-oriented ring 750 as the red-oriented decoration portion is placed adjacently to the near-infrared irradiation portion 780. The upper-bound visible light is disguised by the red-oriented color that is visually recognized at the adjacent position. The upper-bound visible light has a hue similar to that of the red-oriented color and is definitely less distinct than separately placing the near-infrared irradiation portion 780. It is more difficult for the occupant to distinctly recognize the upper-bound visible light. As a result, it is possible to suppress a complicated impression received by the vehicle occupant who visually recognizes the displayed information.

Eighth Embodiment

Figure 18:
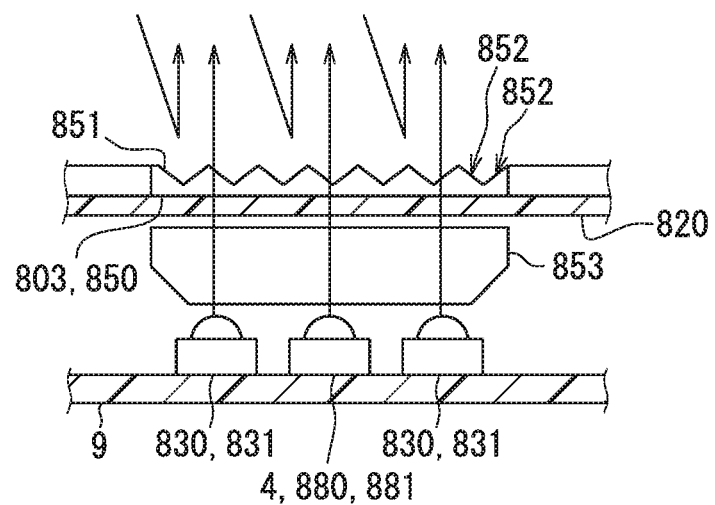
FIG. 18 is a sectional view illustrating placement of a near-infrared irradiation portion and the like according to an eighth embodiment.

As illustrated in FIG. 18, an eighth embodiment is a modification of the first embodiment. The description below explains the eighth embodiment mainly in terms of differences from the first embodiment.

The periphery of a device according to the eighth embodiment is provided with a light-emitting decoration portion 802 that emits the visible decoration light so as to cover a display plate 820 and thereby decorates the display of information supplied from the device. Specifically, the light-emitting decoration portion 802 includes a decoration-use visible light source portion 830 and an uneven transmissive structure 850 placed at the viewing side away from the decoration-use visible light source portion 830.

The decoration-use visible light source portion 830 includes a plurality of decoration-use light-emitting elements 831 to emit the visible decoration light. Each decoration-use light-emitting element 831 uses a light-emitting diode, for example, and is mounted on the viewing side of the substrate 9. Each decoration-use light-emitting element 831 is connected to a power supply via the conductive pattern on the substrate 9 and emits the visible display light to the uneven transmissive structure 850. The present embodiment uses the white light as the visible decoration light emitted from each decoration-use light-emitting element 831. The white light is provided by the light widely scattered over a range corresponding to a wavelength of 400 through 800 nm.

The uneven transmissive structure 850 is provided by a synthetic resin such as polycarbonate resin or acrylic resin so as to be able to transmit the near-infrared light and the visible light. The uneven transmissive structure 850 includes an elaborate uneven structure 851 that is formed on the surface of the viewing side and uses a diamond-cut structure according to the present embodiment, for example. The uneven structure 851 refracts the visible decoration light that is emitted from the decoration-use visible light source portion 830, passes through the light guiding member 853, and transmits the uneven transmissive structure 850 to the viewing side. The occupant is provided with the illumination having an elaborate decoration pattern. Each refracting surface 852 of the uneven structure 851 is formed like a mirror. The uneven transmissive structure 850 also functions as an outside light reflecting portion that reflects the outside light entering from the viewing side to the viewing side again.

The near-infrared irradiation portion 880 according to the eighth embodiment includes a plurality of near-infrared light-emitting elements 881 placed adjacently to the decoration-use light-emitting element 831 in the space shared with the decoration-use visible light source portion 830. Therefore, the uneven transmissive structure 850 emits the white light as the visible decoration light mixed with the near-infrared light including the upper-bound visible light. Of the light emitted from the uneven transmissive structure 850, a ratio of the upper-bound visible light is adjusted to be sufficiently smaller than a ratio of the white light as the visible display light. Therefore, the occupant can recognize a mixture of the near-infrared light including the visible decoration light and the white light as the visible decoration light, if any, as white instead of pink.

The chromatic aberration due to refraction at each refracting surface 852 and a mixture with the reflected outside light make it very difficult for the occupant to distinctly recognize the upper-bound visible light.

The upper-bound visible light included in the light emitted from the near-infrared irradiation portion 880 is likely to be visually recognized and is disguised and thereby restrained from being recognized as being distinctly present. According to the present embodiment, the light-emitting decoration portion 802 functions as a disguise portion 803 that disguises the upper-bound visible light.

According to the above-described eighth embodiment, the light-emitting decoration portion 802 emits the visible decoration light mixed with the near-infrared light including the upper-bound visible light emitted from the near-infrared irradiation portion 880. The upper-bound visible light is disguised by being mixed with the visible decoration light emitted from the light-emitting decoration portion 802. It is difficult for the occupant to distinctly recognize the presence of the upper-bound visible light even when visually recognizing the light-emitting decoration portion 802 along with the information displayed by the light-emitting display portion 2. Therefore, it is possible to suppress a complicated impression.

Ninth Embodiment

Figure 19:
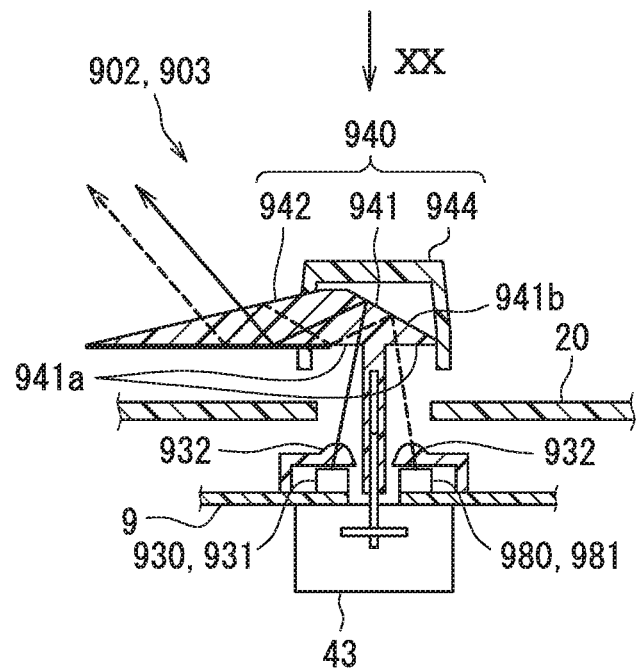
FIG. 19 is a sectional view illustrating placement of a near-infrared irradiation portion and the like according to a ninth embodiment.
Figure 20:
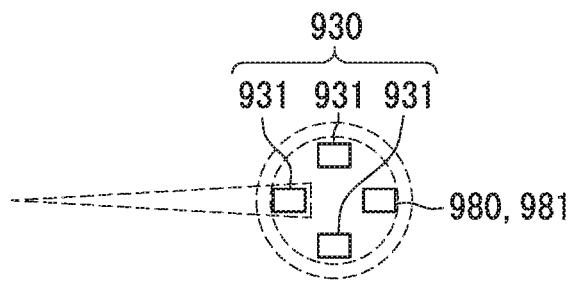
FIG. 20 illustrates the visible light source portion and the near-infrared irradiation portion viewed in an XX direction of FIG. 19.

As illustrated in FIGS. 19 and 20, a ninth embodiment is a modification of the first embodiment. The description below explains the ninth embodiment mainly in terms of differences from the first embodiment.

As illustrated in FIG. 19, a pointer 940 according to the ninth embodiment rotates to display information corresponding to the indicated position similarly to the pointers 40a and 40b according to the first embodiment.

The pointer 940 integrally includes a connecting portion 941 and an indicating portion 942 by using a translucent base material made of synthetic resin such as polycarbonate resin or acrylic resin. The connecting portion 941 is provided so as to pierce through the display plate 20 and is coupled with the rotary shaft of the stepping motor 43 at the counter-viewing side away from the display plate 20. The connecting portion 941 includes an incidence portion 941a and a reflection portion 941b at the viewing side away from the display plate. The incidence portion 941a faces the counter-viewing side and enables an entry of the visible display light and the near-infrared light. When the visible display light and the near-infrared light enter the inside of the connecting portion 941 from the incidence portion 941a, the reflection portion 941b reflects the visible display light and the near-infrared light to the inside of the indicating portion 942. The visible display light and the near-infrared light reflected by the reflection portion 941b are emitted to the viewing side from the inside of the indicating portion 942.

The pointer 940 includes a cap-like cover 944 that covers the connecting portion 941 of the pointer 940 from the viewing side. The cover 944 blocks out the visible display light. The cover 944 according to the present embodiment also blocks out the near-infrared light but may transmit the near-infrared light.

A visible light source portion 930 according to the ninth embodiment includes a plurality of display light-emitting elements 931 that are placed on the viewing side of the substrate 9 to face the incidence portion 941a. A condenser lens 932 is placed between the plurality of display light-emitting elements 931 and the incidence portion 941a. Each display light-emitting element 931 emits the visible display light to the incidence portion 941a. Particularly, the present embodiment emits the light having a red-oriented wavelength as the visible display light that has a peak wavelength of approximately 660 nm. The light having a red-oriented wavelength is recognized as being red.

Similarly to the display light-emitting element 931 of the visible light source portion 930, the near-infrared irradiation portion 980 according to the ninth embodiment includes a near-infrared light-emitting element 981 that is placed on the viewing side of the substrate 9 to face the incidence portion 941a. The condenser lens 932 is placed between the near-infrared light-emitting element 981 and the incidence portion 941a.

Particularly, the present embodiment places three display light-emitting elements 931 and one near-infrared light-emitting element 981 so as to surround the rotary shaft at regular intervals (see FIG. 20).

Accordingly, both the visible display light and the near-infrared light including the upper-bound visible light enter the incidence portion 941a of the pointer 940 from the counter-viewing side. The reflection portion 941b reflects the visible display light mixed with the near-infrared light including the upper-bound visible light. The indicating portion 942 emits and emits the mixture of the light toward the viewing side. The viewing side surface of the indicating portion 942 functions as the red-oriented display region DAr.

As above, the visible light source portion 930 and the pointer 940 configure the light-emitting display portion 902 that displays information by using emission of the visible display light. The driver cannot recognize the upper-bound visible light as being distinct and just recognizes that the pointer 940 is simply illuminated. Therefore, the driver can hardly notice that the face of the driver is illuminated for imaging. FIG. 19 schematically illustrates the visible display light using a solid-line arrow and the near-infrared light including the upper-bound visible light using a broken-line arrow. Actually, however, it is difficult to separately recognize the visible display light and the near-infrared light mixed during transmission through the pointer 940.

The upper-bound visible light included in the light emitted from the near-infrared irradiation portion 980 is likely to be visually recognized and is disguised and thereby restrained from being recognized as being distinctly present. According to the present embodiment, the visible light source portion 930 and the pointer 940 function as a disguise portion 903 that disguises the upper-bound visible light.

According to the above-described ninth embodiment, the pointer 940 rotates and indicates the information corresponding to the indicated position and emits the visible display light mixed with the near-infrared light including the upper-bound visible light emitted from the near-infrared irradiation portion 980. The upper-bound visible light is disguised by being mixed with the visible display light emitted from the pointer 940. Even though visually recognizing the pointer 940, the occupant is highly likely to recognize that the pointer 940 is simply illuminated. It is possible to suppress a complicated impression.

Tenth Embodiment

As illustrated in FIGS. 21 through 25, a tenth embodiment is a modification of the first embodiment. The description below explains the tenth embodiment mainly in terms of differences from the first embodiment.

Figure 21:
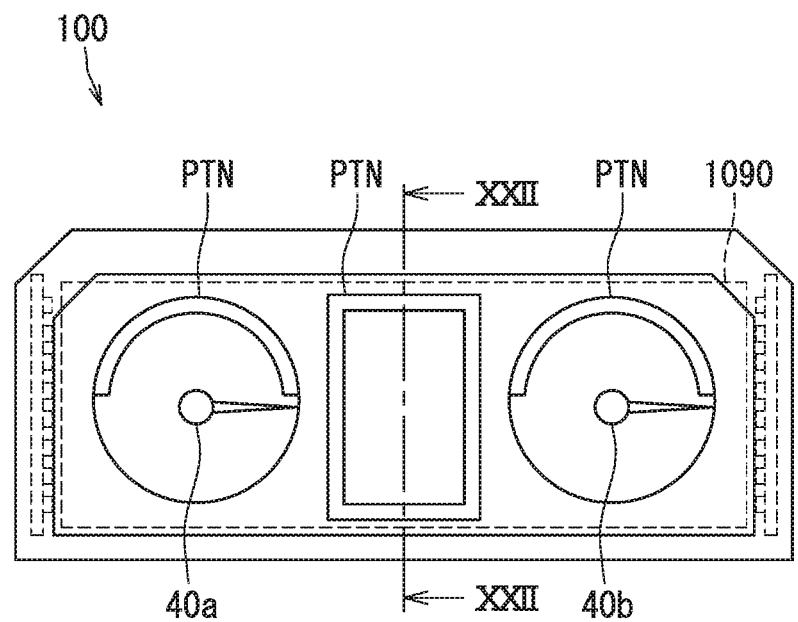
FIG. 21 is a front view illustrating a vehicular display device according to a tenth embodiment.
Figure 22:
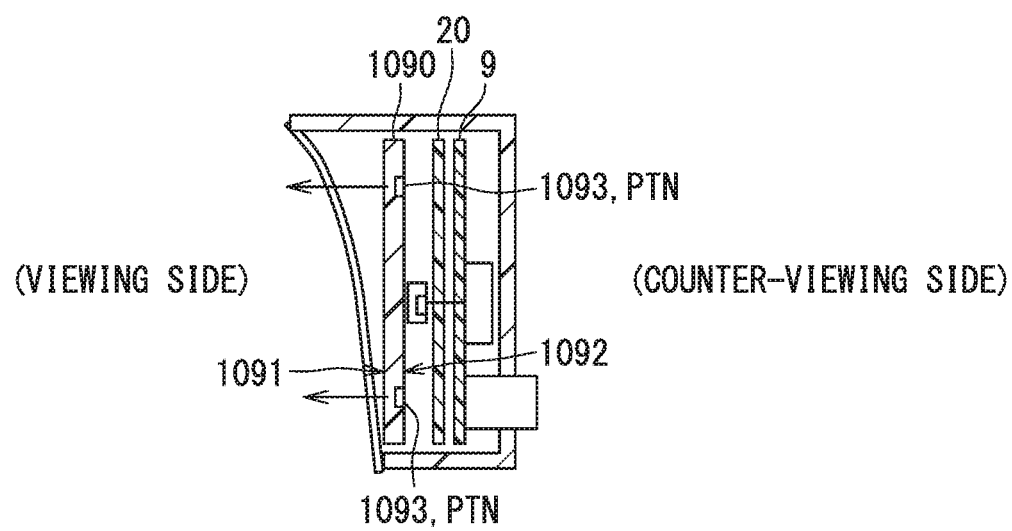
FIG. 22 is a sectional view taken along the line XXII-XXII of FIG. 21.

As illustrated in FIGS. 21 and 22, the tenth embodiment provides a translucent plate 1090 at the viewing side away from the display plate 20. The translucent plate 1090 is made of synthetic resin such as polycarbonate resin or acrylic resin and is formed into a translucent flat plate. The translucent plate 1090 includes a plate surface 1091 facing the viewing side and a rear plate surface 1092 facing the counter-viewing side.

Figure 23:
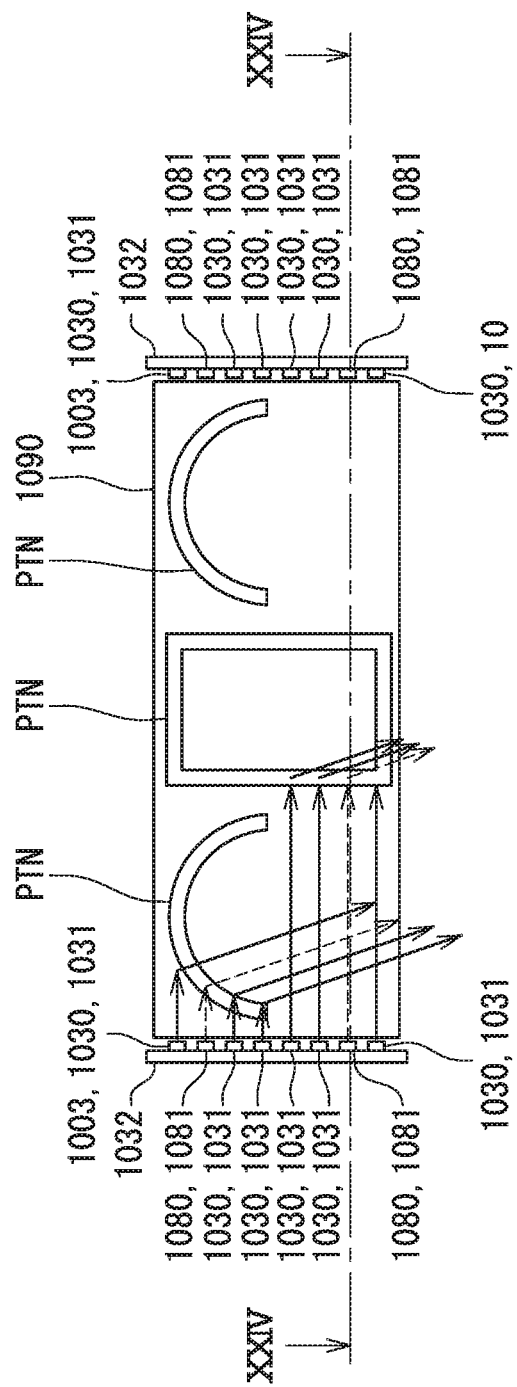
FIG. 23 is a front view illustrating the placement of a near-infrared irradiation portion and the like according to the tenth embodiment.
Figure 24:
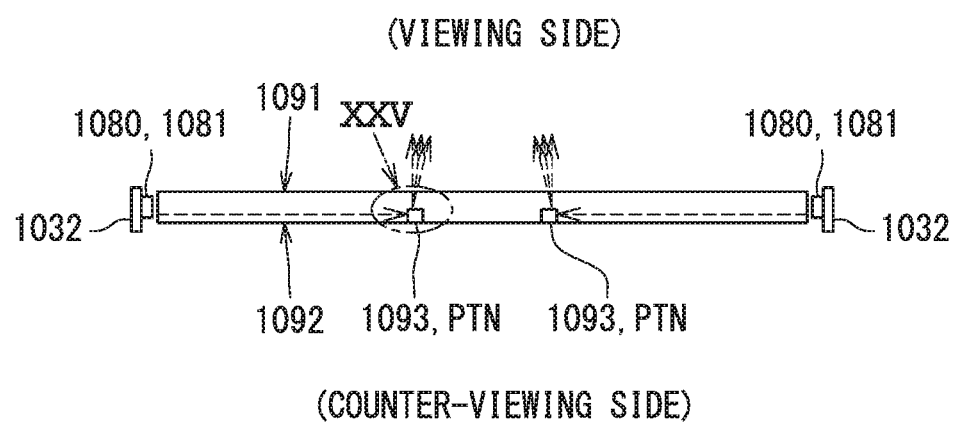
FIG. 24 is a sectional view taken along the line XXIV-XXIV of FIG. 23.

As illustrated in FIGS. 23 and 24, a visible light source portion 1030 includes a plurality of visible light-emitting elements 1031 mounted on an illumination substrate 1032 so as to face an outer edge of the translucent plate 1090. The visible light-emitting elements 1031 are placed along the outer edge of the translucent plate 1090. Each visible light-emitting element 1031 emits the visible light source light as the visible light and supplies the visible light source light to the inside of the translucent plate 1090.

Figure 25:
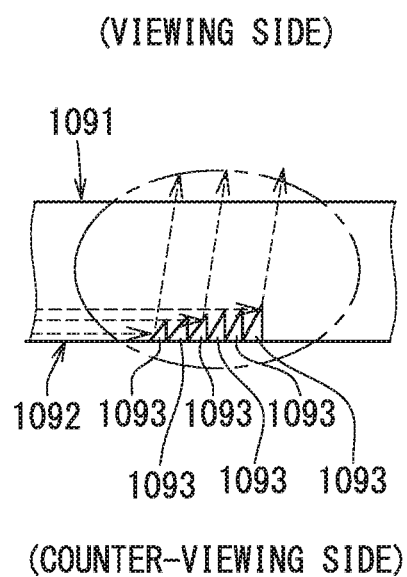
FIG. 25 illustrates an enlarged view of part XXV in FIG. 24.

The translucent plate 1090 is formed correspondingly to the introduction of the visible light source light into the plate inside. Specifically, as illustrated in FIG. 25, the translucent plate 1090 is formed as an element concaved toward the plate surface 1091 from the rear plate surface 1092 and includes a plurality of finely sized reflecting elements 1093 each of which is concaved 5 to 20 μm deep. The reflecting elements 1093 are properly placed on the rear plate surface 1092 to form pattern PTN. Each reflecting element 1093 reflects the visible light source light incorporated into the plate inside to the viewing side. Pattern PTN is thereby illuminated and displayed in a planar form based on a group of the fine reflecting elements 1093. Pattern PTN according to the present embodiment is shaped into a frame and is visually recognized so as to fringe the display of the pointers 40a and 40b and the display screen 11 of the image indicator 10.

As illustrated in FIG. 23, a near-infrared irradiation portion 1080 according to the tenth embodiment includes a near-infrared light-emitting element 1081 placed so as to be inserted between the visible light-emitting elements 1031 alternately placed on the visible light source portion 1030.

Both the visible light source light and the near-infrared light including the upper-bound visible light enter the outer edge of the translucent plate 1090. Inside the translucent plate 1090, the reflecting element 1093 reflects a mixture of the visible display light and the near-infrared light including the upper-bound visible light. The mixture of the light is emitted and emitted toward the viewing side. FIGS. 23 through 25 schematically illustrate part of the visible light source light using a solid-line arrow and part of the near-infrared light including the upper-bound visible light using a broken-line arrow.

The upper-bound visible light included in the light emitted from the near-infrared irradiation portion 1080 is likely to be visually recognized and is disguised and thereby restrained from being recognized as being distinctly present. According to the present embodiment, the visible light source portion 1030 and the translucent plate 1090 function as a disguise portion 1003 that disguises the upper-bound visible light.

According to the above-described tenth embodiment, the near-infrared irradiation portion 1080 is placed on the visible light source portion 1030. The reflecting element 1093 reflects the near-infrared light including the light having the upper-bound wavelength of the visible light and emits the near-infrared light to the viewing side. The upper-bound visible light is disguised by being mixed with the display of pattern PTN provided by the reflecting element 1093. Even though visually recognizing pattern PTN, the occupant is highly likely to recognize that pattern PTN is simply illuminated. It is possible to suppress a complicated impression.

Eleventh Embodiment

Figure 26:
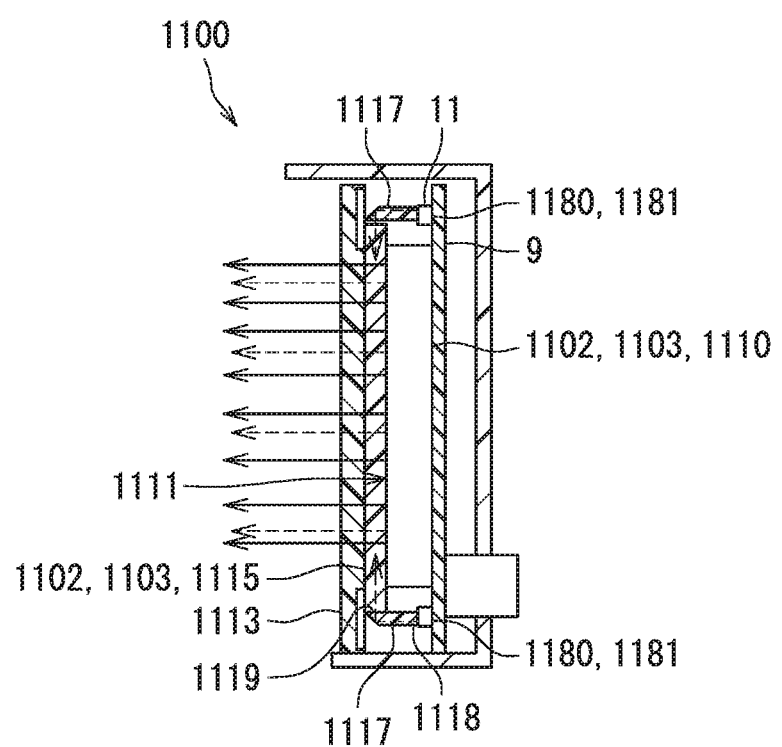
FIG. 26 is a sectional view illustrating placement of a near-infrared irradiation portion and the like according to an eleventh embodiment.

As illustrated in FIG. 26, an eleventh embodiment is a modification of the first embodiment. The description below explains the eleventh embodiment mainly in terms of differences from the first embodiment.

A vehicular display device 1100 according to the eleventh embodiment is a graphic meter including an image indicator 1110, a translucent cover portion 1113, an optical bonding portion 1115, a light guiding member 1117, and a near-infrared irradiation portion 1080.

The image indicator 1110 illuminates and displays images and is provided as a liquid crystal indicator similar to the first embodiment. The image indicator 1110 includes internal parts such as electrodes, wiring, a color filter, and phosphor used for display images.

The translucent cover portion 1113 is made of glass or synthetic resin such as polycarbonate resin or acrylic resin and is shaped into a translucent flat plate. The translucent cover portion 1113 is placed at the viewing side away from the image indicator 1110 by keeping a predetermined distance from a display screen 1111 of the image indicator 1110.

The optical bonding portion 1115 is formed by filling the gap with a translucent medium so as to seal the gap between the display screen 1111 and the translucent cover portion 1113. The optically clear resin (OCR) is used as the translucent medium. The optical bonding portion 1115 is formed as a layer approximately 0.5 through 3.0 mm thick corresponding to the above-described predetermined distance. When the outside light enters the display screen 1111, the optical bonding portion 1115 restrains the outside light from repeatedly reflecting between the translucent cover portion 1113 and the display screen 1111 and improves the visibility of images.

The light guiding member 1117 is made of synthetic resin such as polycarbonate resin or acrylic resin and is formed to be translucent. The light guiding member 1117 places an entry portion 1118 so as to face the substrate 9 placed at the counter-viewing side away from the image indicator 1110. The entry portion 1118 is configured to be able to allow the light to enter the member inside. The light guiding member 1117 places an exit portion 1119 so as to be connected to the end of the optical bonding portion 1115. The exit portion 1119 is configured to be able to allow the light to exit from the member inside.

The near-infrared irradiation portion 980 according to the eleventh embodiment includes a plurality of near-infrared light-emitting elements 1181 placed at a position facing the entry portion 1118 of the light guiding member 1117 at the viewing side of the substrate 9.

The near-infrared light including the upper-bound visible light emitted from the near-infrared light-emitting element 1181 is guided into the light guiding member 1117 via the entry portion 1118 and is supplied to the inside of the optical bonding portion 1115 from the exit portion 1119.

The near-infrared light including the upper-bound visible light enters the inside of the image indicator 1110 from the optical bonding portion 1115 and is diffused by parts such as electrodes, wiring, a color filter, and phosphor. As a result, a mixture of the visible display light caused by illuminating an image displayed by the image indicator 1110 and the near-infrared light including the upper-bound visible light is emitted to the viewing side. FIG. 26 schematically illustrates part of the visible light source light using a solid-line arrow and part of the near-infrared light including the upper-bound visible light using a broken-line arrow.

As above, the image indicator 1110, the translucent cover portion 1113, and the optical bonding portion 1115 configure a light-emitting display portion 1102 that displays information by emitting the visible display light. The upper-bound visible light included in the light emitted from the near-infrared irradiation portion 1180 is likely to be visually recognized and is disguised and thereby restrained from being recognized as being distinctly present. According to the present embodiment, the image indicator 1110, the translucent cover portion 1113, and the optical bonding portion 1115 function as a disguise portion 1103 that disguises the upper-bound visible light.

According to the above-described eleventh embodiment, the near-infrared irradiation portion 1180 supplies the optical bonding portion 1115 with the near-infrared light including the upper-bound visible light. The optical bonding portion 1115 disguises the near-infrared light including the upper-bound visible light mixed with the visible display light emitted from the image indicator 1110. Even though visually recognizing the image indicator 1110, the occupant is highly likely to recognize that an image is simply displayed. It is possible to suppress a complicated impression.

As described in the above-described embodiments, the disguise portion disguises the upper-bound visible light by using the vehicular display device parts such as the display plate index, pointer, and decoration ring having the particular functions and adding the disguise function to these parts.

While there have been described embodiments of the present disclosure, the disclosure should not be understood exclusively in terms of the above-mentioned embodiments but may be applicable to various embodiments and combinations within the spirit and scope of the disclosure.

Specifically, as a first modification, the display plate 20 includes an indicating lamp displaying an alarm to form the red-oriented display region DAr. The red-oriented display region DAr may emit the red display light as the visible display light mixed with the near-infrared light including the upper-bound visible light.

As a second modification, the vehicular display device 100 includes a manipulation switch to form the display region DA such as the white display region DAw, the red-oriented display region DAr, or the yellow-green display region DAg. The display region DA may emit the visible display light mixed with the near-infrared light including the upper-bound visible light.

As a third modification concerning the second and fourth embodiments, the yellow-green display region DAg as a constituent element of the disguise portion 203 is not limited to the use for the fuel-economy indicating lamp 226 or the light-emitting ring 250 to display the fuel efficiency. For example, the display region DAg may be used for energy management display to display traveling states or charging states of an electric vehicle.

As a fourth modification concerning the fourth embodiment, a near-infrared irradiation portion 408 may be placed adjacently to the liquid crystal indicator using the light having a yellow-green wavelength for a backlight or a VFD (vacuum fluorescent display) using a fluorescent display tube.

As a fifth modification concerning the fifth and sixth embodiments, a metallic hairline formed on the display plate 520, 620 may be used as the outside light reflecting portion.

As a sixth modification concerning the seventh embodiment, the red-oriented decoration portion is not limited to the red-oriented ring 750 but may be formed by providing a red-oriented layer on the display plate 720 based on lightproof printing.

As a seventh modification, at least part of the scale index 23a or 23b may be formed by providing a red-oriented layer based on lightproof printing. The near-infrared irradiation portion 80 may be placed adjacently at least part of the scale index 23a or 23b.

As an eighth modification concerning the eighth embodiment, the decoration-use light-emitting element 831 may be configured to emit the red-oriented light or the light having a yellow-green wavelength as the visible decoration light.

Figure 27:
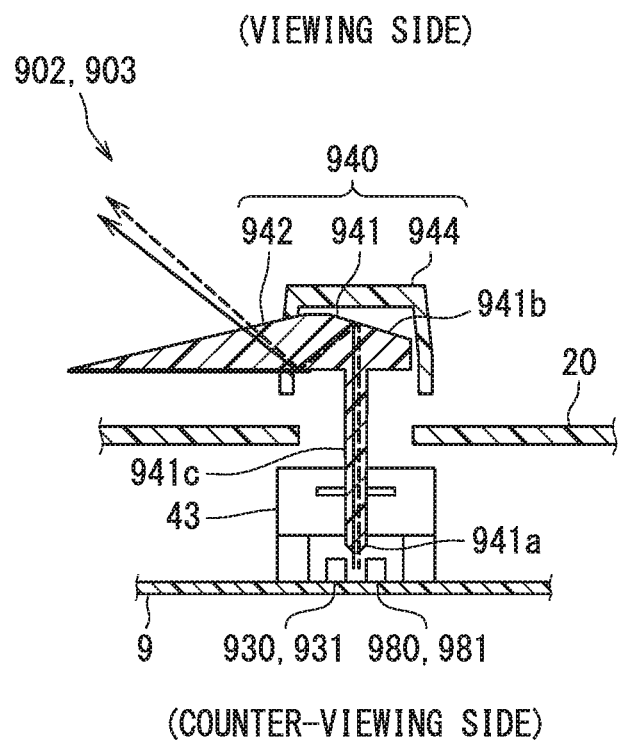
FIG. 27 is a diagram corresponding to FIG. 19 according to a ninth modification.
Figure 28:
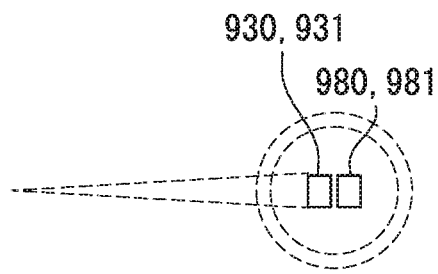
FIG. 28 is a diagram corresponding to FIG. 20 according to the ninth modification.

A ninth modification concerning the ninth embodiment may use a pointer 940 based on intra-shaft light guiding. According to an example illustrated in FIGS. 27 and 28, the connecting portion 941 of the pointer 940 protrusively forms a through-shaft 941c penetrating the inside of the stepping motor 43. The through-shaft 941c also functions as the rotary shaft of the stepping motor 43. As the through-shaft 941c penetrates the stepping motor 43, the tip of the through-shaft 941c is exposed from the stepping motor 43 and is used as an incidence portion 941a that allows the visible display light and the near-infrared light to enter the inside of the through-shaft 941c.

The visible display light from the display light-emitting element 931 placed on the substrate 9 is mixed with the near-infrared light including the upper-bound visible light from the near-infrared light-emitting element 981, enters the incidence portion 941a, and is guided by the through-shaft 941c to the indicating portion 942 at the viewing side.

As a tenth modification concerning the ninth embodiment, the display light-emitting element 931 may emit the light having a yellow-green wavelength or the white light as the visible display light.

As an eleventh modification concerning the tenth embodiment, the reflecting element 1093 may not be concaved from the rear plate surface 1092. For example, the reflecting element 1093 can be formed by printing optical ink on the rear plate surface 1092.

As a twelfth modification concerning the tenth embodiment, a plurality of the reflecting elements 1093 may not be formed in fine sizes to display pattern PTN that is illuminated in a planar form based on a group of the reflecting elements 1093. For example, the reflecting element 1093 may be concaved within a range from 0.3 to 1.0 mm deep and include a side wall face shaped into scales or numerals so that the outline displays information. The side wall face may be illuminated by reflecting the visible light source light and the near-infrared light including the upper-bound visible light.

As a thirteenth modification concerning the tenth embodiment, pattern PTN displays information. The visible light source portion 1030 and the translucent plate 1090 may function as the light-emitting display portion that displays the information by emitting the visible display light.

As a fourteenth modification, the display light-emitting element 31 using the light-emitting diode may be replaced by a self-luminous phosphor, a photoluminescent material, an element emitting the visible light including ultraviolet light, and a coating material emitting the visible light including ultraviolet light.

As a fifteenth modification, the imaging portion 60 may be placed at a position other than the position next to the image indicator 10 inside the vehicular display device 100. Of the imaging system 4, the near-infrared irradiation portion 80 may be placed inside the vehicular display device 100. At least part of the imaging portion 60 and the image processing portion 70 may be placed outside the vehicular display device 100.

As a sixteenth modification, an imaging target for the imaging portion 60 is not limited to the face of an occupant. For example, a hand or an arm may be recognized as an imaging target to determine the gestural manipulation or a physical condition such as the pulse wave of the occupant.

Twelfth Embodiment

An illumination device 10020 according to a twelfth embodiment of the present disclosure is mounted on a vehicle and emits the illuminating light to image a vehicle occupant. The illumination device 10020 along with an imaging device 10010 configures an imaging system 10009. The imaging system 10009 according to the present embodiment images the face of a vehicle occupant, particularly, a driver as an imaging target, processes the image and is thereby used for a driver status monitor (DSM) that monitors driver states for drowsy driving or inattentive driving.

Figure 29:
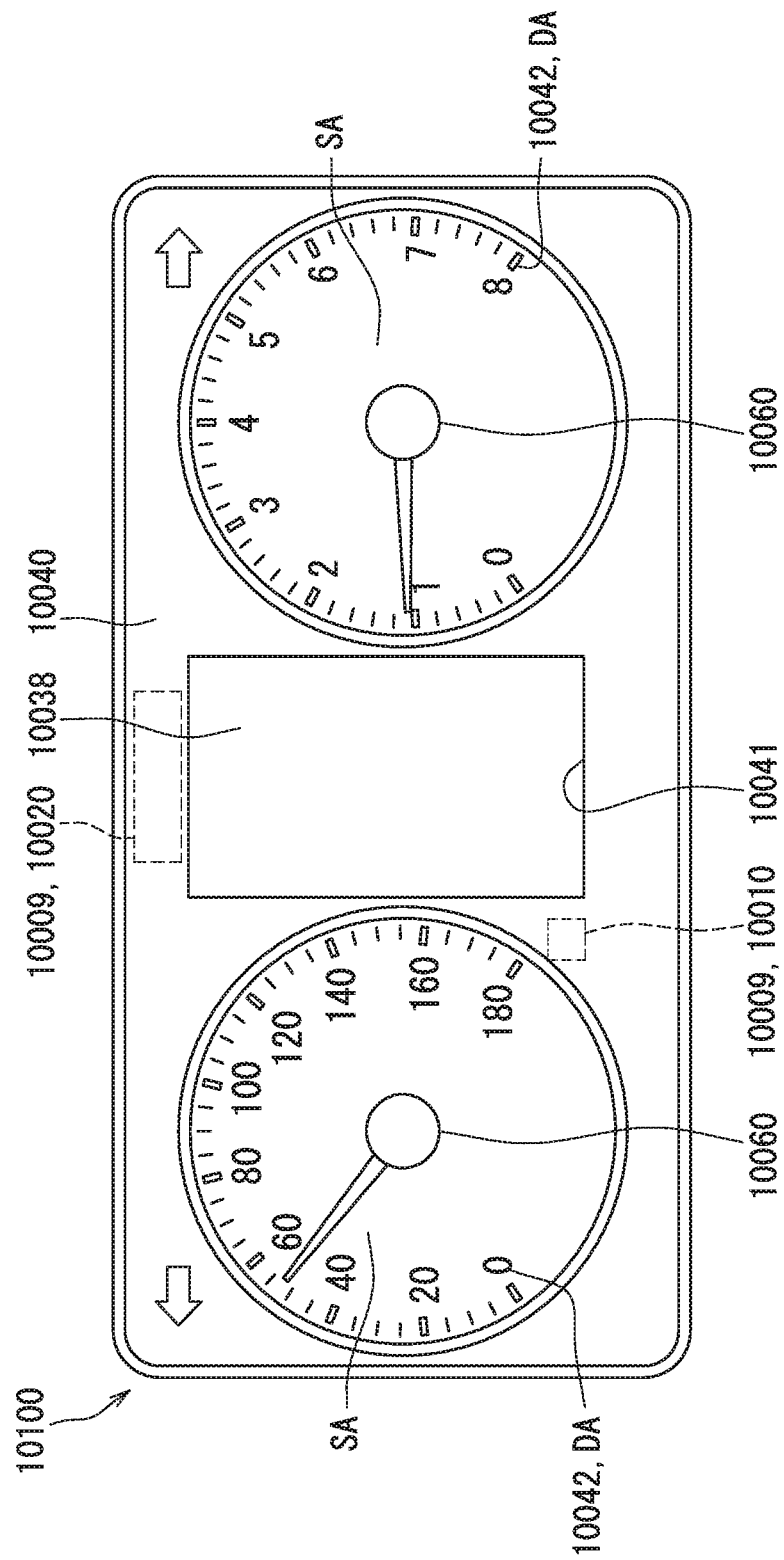
FIG. 29 is a front view illustrating a vehicular display device according to a twelfth embodiment.

As illustrated in FIG. 29, the illumination device 10020 according to the present embodiment is placed inside a vehicular display device 10100 formed integrally with the imaging system 10009. Together with the vehicular display device 10100, the illumination device 10020 is placed at an instrument panel facing a seat where the occupant as a viewer sits.

The vehicular display device 10100 is configured as a combination meter of analog display using an index 10042 pointed by a pointer 10060 and digital display using images displayed on an image indicator 10038 and displays information toward the viewing side. The displayed information includes vehicle states such as vehicle speed, engine speed, fuel level, coolant temperature, current values of an electric motor, and vehicle anomalies, for example. The other displayed information includes warning, road information, visibility assisting information, and electronic mail, for example.

The vehicular display device 10100 includes the image indicator 10038, a display plate 10040, a display light source portion 10050, the pointer 10060, and the imaging system 10009, for example.

The image indicator 10038 is placed approximately at the center of the vehicular display device 10100. The image indicator 10038 according to the present embodiment is provided as a transmissive liquid crystal panel using a thin film transistor (TFT) and is configured as a liquid crystal indicator using an active matrix liquid crystal panel provided by a plurality of two-dimensionally arrayed liquid crystal pixels. The image indicator 10038 may use an organic EL display other than the liquid crystal indicator.

The display plate 10040 is generally referred as a dial plate and is provided as an exposed component that is exposed in the space surrounded by a facing plate cylindrically formed at the viewing side and a transparent plate to close a viewing side opening of the facing plate in the vehicular display device 10100. The display plate 10040 is shaped into a flat plate by partially or overall applying semi-translucent or lightproof printing to the surface of a translucent base material made of synthetic resin such as polycarbonate resin or acrylic resin, for example. Painting may replace printing. An optical resin or an optical filter material to transmit the near-infrared light may be attached to and held by the display plate 10040.

The display plate 10040 is placed toward the viewing side away from the image indicator 10038. An aperture hole 10041 is provided at a position where the display plate 10040 overlaps with the image indicator 10038 so that an image is displayed to the viewing side without being hidden by the display plate 10040. The index 10042 indicated by the pointer 10060 is formed in each of the right and left regions sandwiching the image indicator 10038 on the display plate 10040. The visible light source portion illuminates the index 10042 on the display plate 10040 from a side (hereinafter referred to as a counter-viewing side) opposite the viewing side.

Figure 30:
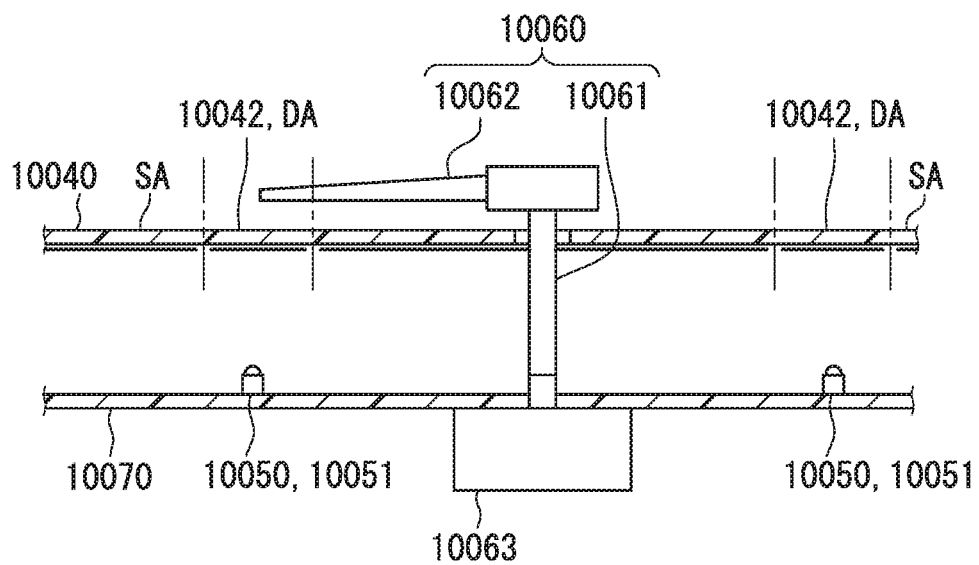
FIG. 30 is a sectional view illustrating a pointer and the like in the vehicular display device according to the twelfth embodiment.

As illustrated in FIG. 30, the display light source portion 10050 is placed at the counter-viewing side away from the display plate 10040 and includes a plurality of display light-emitting elements 10051 to emit the visible display light. Each display light-emitting element 10051 uses a light-emitting diode, for example. Each display light-emitting element 10051 is connected to a power supply via the conductive pattern on a substrate 10070 and emits the visible display light to the display plate 10040. According to the present embodiment, each display light-emitting element 10051 uses the white light provided by the light widely scattered over a range corresponding to a wavelength of 400 through 800 nm.

The above-described printing forms the lightproof region SA and the display region DA on the display plate 10040. The lightproof region SA occupies a large area of the display plate 10040. The lightproof region SA is printed in a dark color (such as black) to be lightproof and thereby blocks the visible display light from the counter-viewing side. Semi-translucent printing or no printing is applied to the display region DA. Therefore, the display region DA transmits the visible light source light from the counter-viewing side to the viewing side. The index 10042 provided for the display region DA is illuminated and displayed.

A plurality of pointers 10060 are provided corresponding to the right and left regions of the display plate 10040. The present embodiment provides one pointer 10060 for each of the right and left regions. Each pointer 10060 integrally includes a connecting portion 10061 and an indicating portion 10062. The connecting portion 10061 is placed at the counter-viewing side away from the display plate 10040 and is coupled with the rotary shaft of a stepping motor 10063 supported on the flat substrate. The indicating portion 10062 is placed at the viewing side away from the display plate 10040 and is shaped into a needle to be able to indicate the index 10042.

Each pointer 10060 rotates around a pointer shaft according to output from the stepping motor 10063 and indicates the corresponding index 10042 to display information corresponding to the indicated position. According to the present embodiment, the pointer 10060 and the index 10042 on the left indicate vehicle speed. The pointer 10060 and the index 10042 on the right indicate an engine speed of the vehicle.

Figure 31:
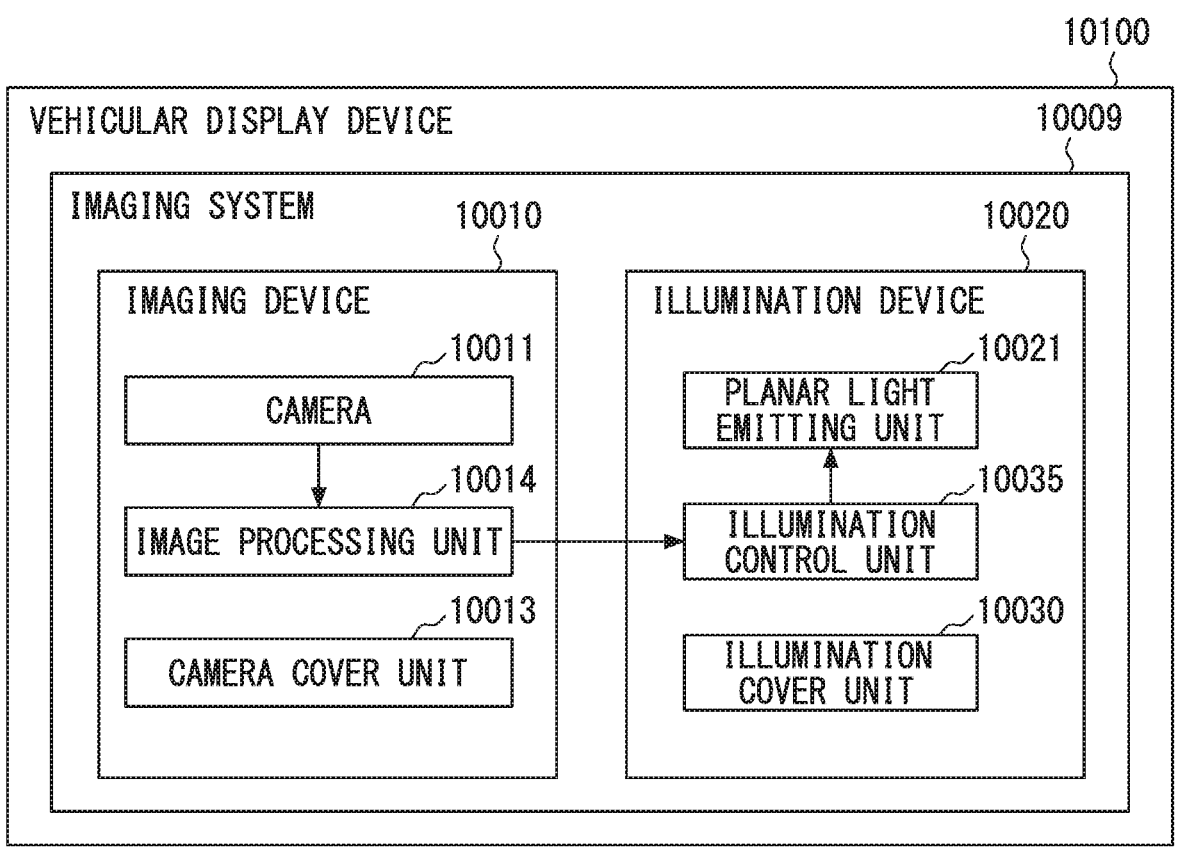
FIG. 31 is a block diagram illustrating a vehicular display device, an imaging system, an imaging device, and an illumination device according to the twelfth embodiment.
Figure 32:
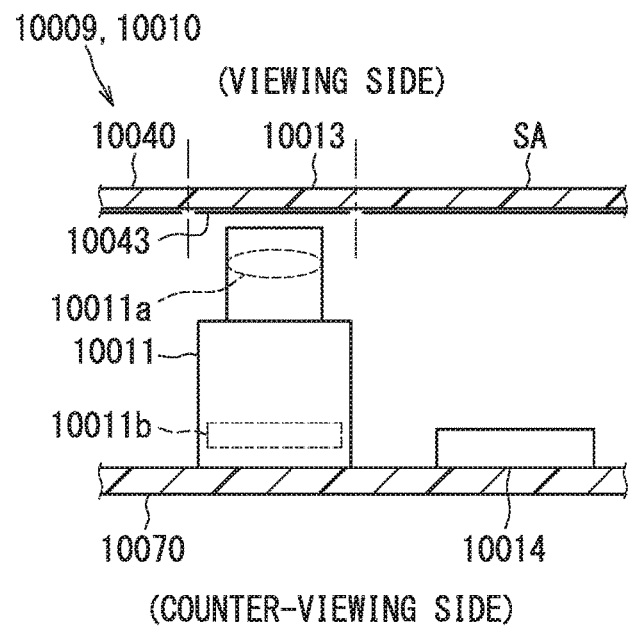
FIG. 32 is a sectional view illustrating the imaging device according to the twelfth embodiment.

As illustrated in FIG. 31, the imaging system 10009 includes the imaging device 10010 and the illumination device 10020. The imaging device 10010 images a vehicle occupant (particularly the face of a driver according to the present embodiment). As illustrated in FIG. 32, the imaging device 10010 includes a camera 10011, a camera cover portion 10013, and an image processing portion 10014. The camera 10011 is placed at the counter-viewing side away from the display plate 10040, for example, next to the image indicator 10038.

The camera 10011 includes a detection element 10011*a* and a lens 10011*b* to form an imaging target on the detection element 10011*a*. For example, the detection element 10011*a* uses a CMOS sensor or a comparable element that features excellent sensitivity ranging from the visible light to the light having the upper-bound wavelength of the visible light (including the near-infrared light) and ensures high resolution for detected images. The light having the upper-bound wavelength of the visible light (hereinafter referred to as the upper-bound visible light) signifies the light having a wavelength of 780 through 830 nm approximate to the upper bound visible to the human eye.

The display plate 10040 includes a near-infrared light transmitting filter layer 10043 printed at a position facing the camera 10011 and thereby forms the flat camera cover portion 10013 to cover the camera 10011 from the viewing side. The near-infrared light transmitting filter layer 10043 transmits the near-infrared light including the upper-bound visible light. A small transmission factor is assigned to the visible light having a wavelength shorter than the wavelength of the upper-bound visible light. The detection element can detect the near-infrared light including the upper-bound visible light. At the viewing side, the occupant cannot distinctly visually recognize the camera.

The image processing portion 10014 is embodied as a functional block mainly provided by an electronic circuit including at least one processor, memory, and input/output interface mounted on the substrate 10070. The processor can perform image processing by executing a computer program stored in the memory based on a signal that is input via the input/output interface and is acquired from the detection element. In more detail, the image processing portion 10014 generates image data representing the imaged imaging target from a signal input from the detection element 10011*a*. The generated image data may be directly output to the outside of the vehicular display device 10100 such as a vehicular ECU (Electric Control Unit) to be analyzed by the ECU. Alternatively, the image processing portion 10014 may analyze the image data to determine a driver state for drowsy driving or inattentive driving.

Figure 33:
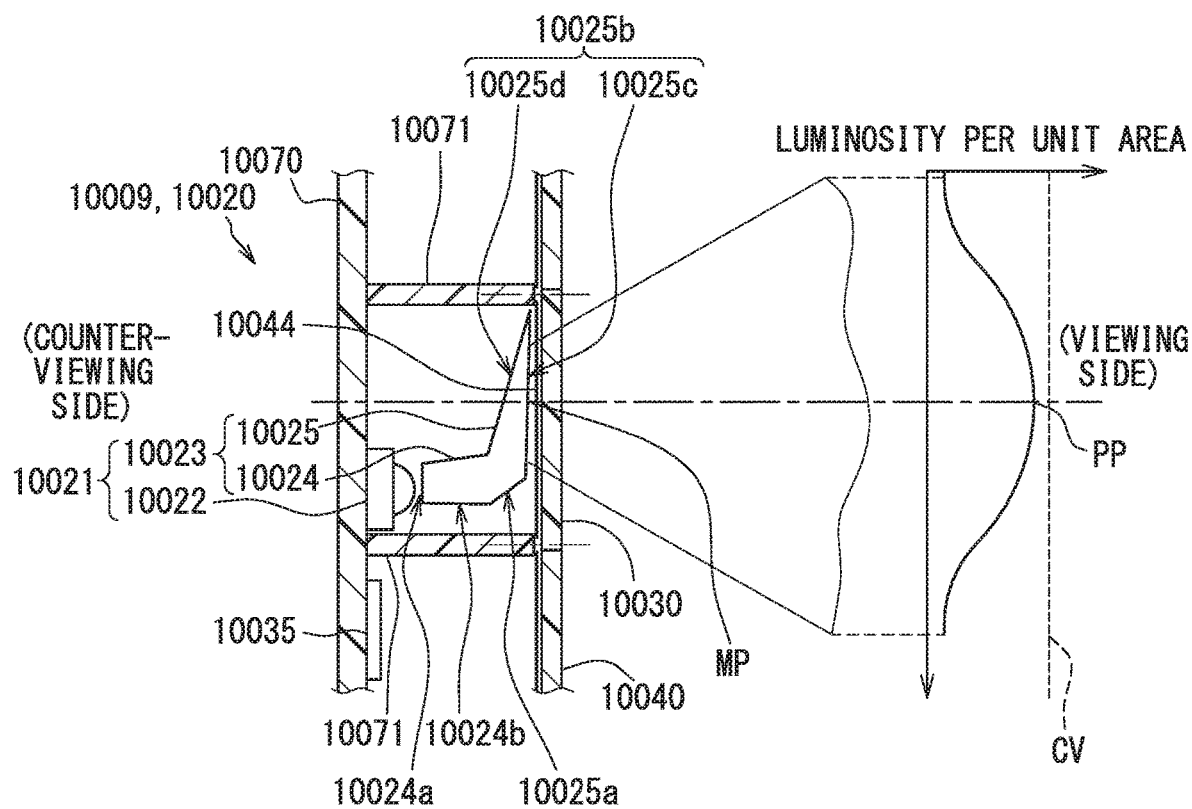
FIG. 33 is a diagram illustrating the illumination device according to the twelfth embodiment including a sectional view of the illumination device at the left side and schematic distribution of the illuminating light at the right side.

As illustrated in FIG. 33, the illumination device 10020 uses the illuminating light to illuminate the occupant imaged by the imaging device 10010. The illumination device 10020 includes a planarly light-emitting portion 10021, an illumination cover portion 10030, and an illumination control portion 10035. In the vehicular display device 10100, the planarly light-emitting portion 10021 is placed in the space separated from the visible light source portion across a lightproof wall 10071 at the counter-viewing side away from the display plate 10040.

A near-infrared light transmitting filter layer 10044 is provided at a position facing the planarly light-emitting portion 10021 in the display plate 10040 to form the planar illumination cover portion 10030 that covers the planarly light-emitting portion 10021 from the viewing side. Similar to the camera cover portion 10013, the near-infrared light transmitting filter layer 10044 transmits the near-infrared light including the upper-bound visible light and assigns a small transmission factor to the visible light having a wavelength shorter than the wavelength of the upper-bound visible light.

In the illumination cover portion 10030 according to the present embodiment, the viewing side surface is exposed in the space of the vehicular display device 10100 and is provided with an uneven decoration pattern harmonizing with the surface treatment for an instrument panel, steering parts, or a meter hood as peripheral parts of the vehicular display device 10100. The decoration pattern may be provided by the printing or attaching films. In this case, metallic, carbonous, or wood-grain decoration patterns may be available. The decoration pattern reduces an appearance difference between the illumination cover portion 10030 and the above-described peripheral parts, making the presence of the illumination device 10020 indistinct.

The planarly light-emitting portion 10021 includes a near-infrared light-emitting element 10022 and a planarly light-emitting optical element 10023. The near-infrared light-emitting element 10022 uses a light-emitting diode, for example. The near-infrared light-emitting element 10022 is supported on the viewing side surface of the substrate 10070 and is connected to a power supply via the conductive pattern on the substrate 10070 to emit the near-infrared light including the upper-bound visible light. The near-infrared light-emitting element 10022 according to the present embodiment features wavelength characteristics indicating a peak wavelength of 850 nm and a half-value width of 30 through 40 nm, for example.

The planarly light-emitting optical element 10023 is placed between the near-infrared light-emitting element 10022 and the illumination cover portion 10030 and provided by a prism lens mainly formed of a translucent base material made of synthetic resin such as polycarbonate resin or acrylic resin. The planarly light-emitting optical element 10023 includes an entry portion 10024 and a planarly light-emitting portion 10025. The entry portion 10024 allows entry of the near-infrared light including the upper-bound visible light from the near-infrared light-emitting element 10022. The planarly light-emitting portion 10025 planarly emits and emits the near-infrared light including the upper-bound visible light entering the entry portion 10024.

The entry portion 10024 is formed so as to protrude from the planarly light-emitting portion 10025 toward the counter-viewing side and includes an entry plane 10024*a* facing the near-infrared light-emitting element 10022 by leaving a slight gap. The entry plane 10024*a* is formed into a mirror surface and efficiently incorporates the near-infrared light including the upper-bound visible light emitted from the near-infrared light-emitting element 10022 into the inside of the base material. The near-infrared light including the upper-bound visible light is incorporated into the inside of the base material, reflects off a sidewall reflection surface 10024*b* formed as a sidewall for the entry portion 10024, and is guided to the planarly light-emitting portion 10025 at the viewing side.

The planarly light-emitting portion 10025 includes a deflective reflection surface 10025*a* and a plate portion 10025*b*. The deflective reflection surface 10025*a* is placed at the viewing side of the entry plane 10024*a*. The plate portion 10025*b* extends in the direction of extending the illumination cover portion 10030 from the deflective reflection surface 10025*a*. The deflective reflection surface 10025*a* reflects the near-infrared light including the upper-bound visible light guided to the entry portion 10024 so that the near-infrared light deflects toward the plate portion 10025*b*.

The plate portion 10025*b* is formed into a rectangular plate and includes a facing surface 10025*c* and a rear surface 10025*d*. The facing surface 10025*c* faces the illumination cover portion 10030. The rear surface 10025*d* is formed on the other side of the body of the plate portion 10025*b* so as to be opposite to the facing surface 10025*c*. An angle between the facing surface 10025*c* and the rear surface 10025*d* is adjusted so that the distance between the facing surface 10025*c* and the rear surface 10025*d* decreases with distance from the deflective reflection surface 10025*a*. The present embodiment embosses the facing surface 10025*c* and the rear surface 10025*d* to be rough-surfaced. The facing surface 10025*c* and the rear surface 10025*d* diffuse the near-infrared light including the upper-bound visible light to provide the planar light emission.

The planarly light-emitting portion 10021 planarly emits the illuminating light as the near-infrared light including the upper-bound visible light. Particularly, the planarly light-emitting portion 10021 according to the present embodiment planarly emits the illuminating light in a rectangular form based on the shape of the plate portion 10025b. The planarly emitted illuminating light passes through the illumination cover portion 10030 and illuminates the vehicle occupant.

The illumination control portion 10035 is embodied as a functional block mainly provided by an electronic circuit including at least one processor, memory, and input/output interface mounted on the substrate 10070. The electronic circuit may be provided independently for the illumination device 10020, may be provided in common with an electronic circuit to embody the image processing portion 10014 of the imaging device 10010, or may be provided in common with a control circuit to control the image indicator 10038 and the pointer 10060, for example.

The illumination control portion 10035 controls turn on or off the near-infrared light-emitting element 10022 in accordance with the state of turning on or off an ignition switch of the vehicle. The illumination control portion 10035 controls the amount of light emission from the near-infrared light-emitting element 10022 when turned on.

The light distribution is adjusted based on settings concerning angles of the deflective reflection surface 10025a, the facing surface 10025c, and the rear surface 10025d, and rough-surfaced states of the facing surface 10025c and the rear surface 10025d. The planar light emission of the near-infrared light including the upper-bound visible light accordingly distributes the luminosity (corresponding to the brightness) per unit area (see the right side of FIG. 33).

According to the present embodiment, an approximate center of the facing surface 10025c forms a maximal position MP that causes the maximal luminosity of the illuminating light per unit area in the planarly light-emitting portion 10021. The maximal position MP corresponds to a peak position PP in the above-described distribution. The present embodiment forms one maximal position MP. The luminosity of the illuminating light per unit area gradually decreases with distance from the maximal position MP.

As generally known, the luminosity is calculated by weighting the radiation intensity with the luminosity factor for each wavelength. The illuminating light according to the present embodiment is the near-infrared light but includes the light (upper-bound visible light) that has a wavelength of 780 through 830 nm and indicates a luminosity factor larger than 0. The luminosity of the illuminating light indicates a value larger than 0.

In the planarly light-emitting portion 10021, the luminosity of the illuminating light per unit area at the maximal position MP is set to be smaller than a sensing limit value CV representing a lower limit for an occupant who visually recognizes the illumination device 10020 and can relatively distinctly sense the upper-bound visible light. The sensing limit value CV is a concept newly disclosed in the present embodiment. When the luminosity of the illuminating light per unit area at the maximal position MP is larger than or equal to the sensing limit value CV, the occupant visually recognizes the illumination device 10020 and can distinctly sense the emission of the upper-bound visible light at the maximal position MP. When the luminosity of the illuminating light per unit area at the maximal position MP is smaller than the sensing limit value CV, the occupant cannot distinctly sense the emission of the upper-bound visible light.

The sensing limit value CV is not an invariably constant absolute value, depends on the surrounding environment, and varies with the surrounding environment. When the vehicle interior is dark at night, for example, the occupant can easily sense the upper-bound visible light as being distinct. The sensing limit value CV decreases. When the vehicle interior is bright in the daytime, for example, the upper-bound visible light exists in the surrounding outside light. The occupant can hardly sense the upper-bound visible light as being distinct. The sensing limit value CV increases.

As above, the decoration pattern of the illumination cover portion 10030 may provide a camouflaging disguise effect and cause the occupant to hardly sense the upper-bound visible light as being distinct. The sensing limit value CV increases more than a case where the illumination cover portion 10030 is unpatterned.

A small irradiance per unit area is attributable to the illumination device 10020 including the planarly light-emitting portion 10021 that planarly emits the light. However, an increase in the light emission area ensures the total amount of radiant energy of the illuminating light. In this case, the total amount thereof is available from a product of the multiplication between the irradiance per unit area and the light emission area. It is possible to supply the illuminating light sufficient enough to illuminate an occupant in the vehicle.

The illumination control portion 10035 may vary the amount of light emission (the amount of radiant energy) from the near-infrared light-emitting element depending on an increase or a decrease in the sensing limit value CV. When the sensing limit value CV decreases, it may be favorable to preferentially ensure the total amount of radiant energy for the illuminating light without varying the amount of light emission.

(Operation and Effect)

The description below explains the operation and effect of the twelfth embodiment described above.

The illumination device 10020 according to the twelfth embodiment allows the planarly light-emitting portion 10021 to planarly emit the illuminating light as the near-infrared light including the upper-bound visible light. Planar distribution of the light emission can decrease the luminosity per unit area. The light emission is distributed at the maximal position MP that maximizes the luminosity per unit area in the planarly light-emitting portion 10021 so that the luminosity per unit area is smaller than the sensing limit value CV. When viewing the planarly light-emitting portion 10021, the occupant can hardly sense the upper-bound visible light as being distinct, restraining a complicated impression from being given to the occupant.

According to the twelfth embodiment, the illumination device 10020 further includes the illumination cover portion 10030 that covers the planarly light-emitting portion 10021 and transmits the illuminating light. The illumination cover portion 10030 restrains the planarly light-emitting portion 10021 from being exposed and directly visually recognized, making the presence of the planarly light-emitting portion 10021 indistinct. It is possible to restrain a complicated impression from being given to the occupant.

According to the twelfth embodiment, the illumination cover portion 10030 is provided for the display plate 10040 as an exposed component exposed to the viewing side of the vehicular display device 10100. The vehicular display device 10100 displays information toward the viewing side, making the exposed component particularly noticeable. The planarly light-emitting portion 10021 is placed at the position covered with the display plate 10040 as the noticeably exposed component and advantageously illuminates an occupant face, for example. The light emission is distributed at the maximal position MP of the planarly light-emitting portion 10021 so that the luminosity per unit area is smaller than the sensing limit value CV. When viewing the display plate 10040 as the exposed component, the occupant can hardly sense the upper-bound visible light as being distinct. It is possible to restrain a complicated impression from being given to the occupant.

According to the twelfth embodiment, the illumination device 10020 includes the planarly light-emitting optical element 10023 that planarly emits the near-infrared light including the upper-bound visible light emitted from the near-infrared light-emitting element 10022. The planar light emission using the planarly light-emitting optical element 10023 can easily embody the planarly light-emitting portion 10021 that planarly emits the light.

According to the twelfth embodiment, the planarly light-emitting optical element 10023 is provided as a prism lens made of the translucent base material. The planarly light-emitting optical element 10023 inward absorbs, guides, and planarly emits the near-infrared light including the upper-bound visible light emitted from the near-infrared light-emitting element 10022. The upper-bound visible light from the near-infrared light-emitting element 10022 can be distributed accordingly by appropriately designing shapes of the prism lens. It is possible to easily configure the luminosity per unit area at the maximal position MP to be smaller than the sensing limit value CV.

The imaging system 10009 according to the twelfth embodiment allows the planarly light-emitting portion 10021 to planarly emit the illuminating light as the near-infrared light including the upper-bound visible light. Planar distribution of the light emission can decrease the luminosity per unit area. The light emission is distributed at the maximal position MP that maximizes the luminosity per unit area in the planarly light-emitting portion 10021 so that the luminosity per unit area is smaller than the sensing limit value CV. When viewing the planarly light-emitting portion 10021, the occupant can hardly sense the upper-bound visible light as being distinct. It is possible to restrain a complicated impression from being given to the occupant.

The imaging device 10010 can sense and image the upper-bound visible light that is hardly sensed as being distinct. The imaging system 10009 effectively uses the illuminating light, making it possible to restrain the imaging quality from degrading.

The vehicular display device 10100 according to the twelfth embodiment allows the planarly light-emitting portion 10021 to planarly emit the illuminating light as the near-infrared light including the upper-bound visible light. Planar distribution of the light emission can decrease the luminosity per unit area. The light emission is distributed at the maximal position MP that maximizes the luminosity per unit area in the planarly light-emitting portion 10021 so that the luminosity per unit area is smaller than the sensing limit value CV. When viewing the displayed information, the occupant receives the illuminating light from the planarly light-emitting portion 10021 but can hardly sense the upper-bound visible light as being distinct. It is possible to restrain a complicated impression from being given to the occupant.

Figure 34:
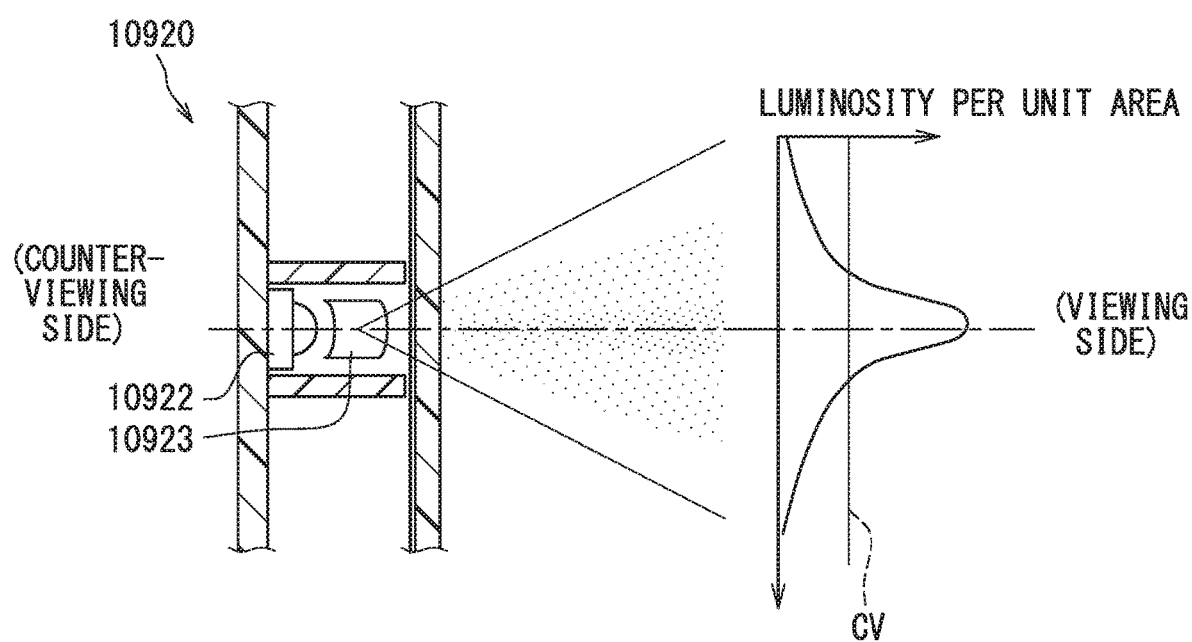
FIG. 34 is a diagram illustrating an illumination device according to a comparative example including a sectional view of the illumination device at the left side and schematic distribution of the illuminating light at the right side.

The following provides an additional explanation about the twelfth embodiment in comparison with a comparative example. FIG. 34 illustrates an illumination device 10920 according to the comparative example. In the illumination device 10920, a near-infrared light-emitting element 10922 emits the near-infrared light including the upper-bound visible light. A lens 10923 condenses and locally emits the near-infrared light. As seen from the comparison with FIG. 33, the comparative example causes the luminosity per unit area to exceed the sensing limit value CV. As a result, the occupant distinctly recognizes part of the upper-bound visible light exceeding the sensing limit value CV.

Thirteenth Embodiment

As illustrated in FIGS. 35 through 39, a thirteenth embodiment is a modification of the twelfth embodiment. The description below explains the thirteenth embodiment mainly in terms of differences from the twelfth embodiment.

Figure 35:
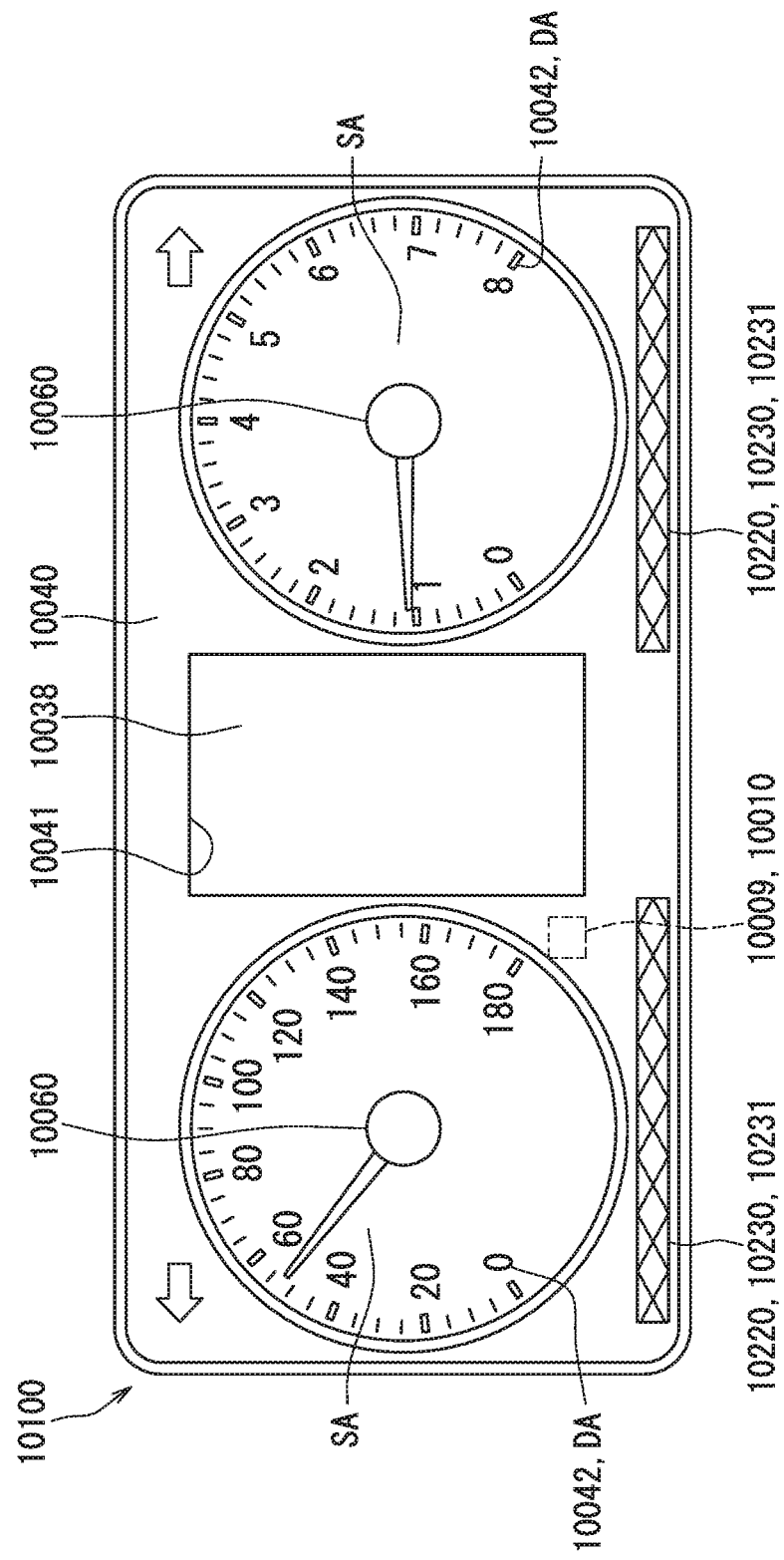
FIG. 35 is a front view illustrating a vehicular display device according to a thirteenth embodiment.
Figure 37:
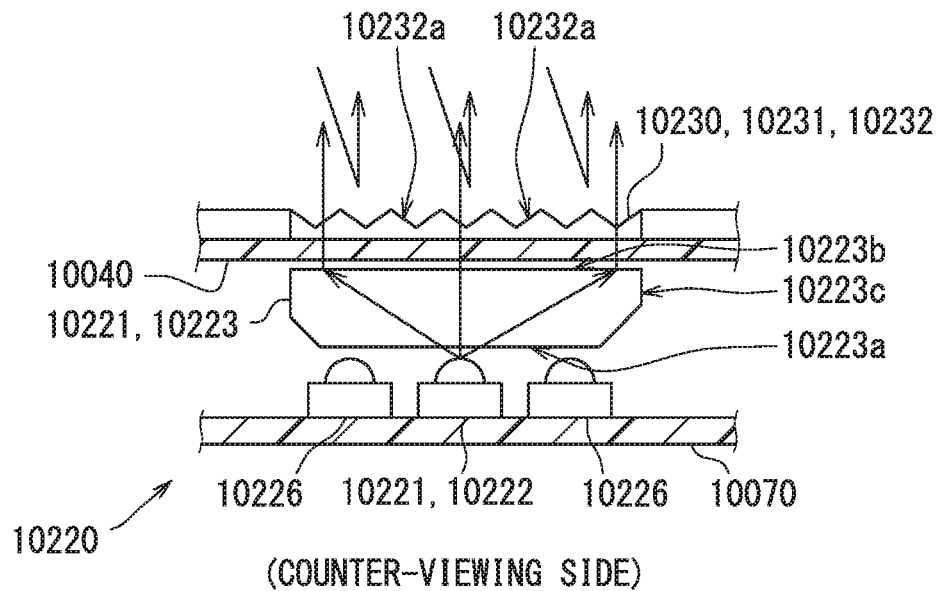
FIG. 37 is a sectional view illustrating the illumination device according to the thirteenth embodiment on condition that the ambient brightness is sufficiently high.
Figure 38:
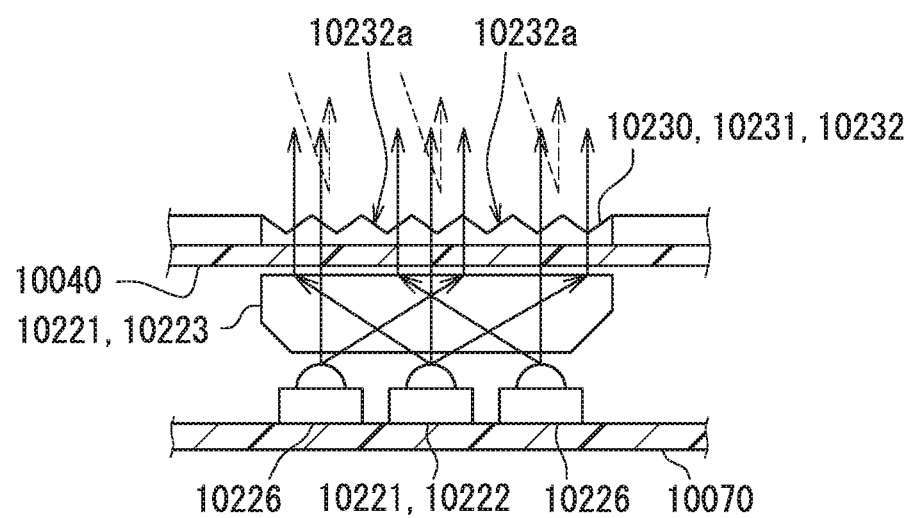
FIG. 38 is a sectional view illustrating the illumination device according to the thirteenth embodiment on condition that the ambient brightness is low.

FIG. 35 illustrates an illumination device 10220 according to the thirteenth embodiment. In the illumination device 10220, an illumination cover portion 10230 includes a reflecting structure portion 10231 instead of the decoration pattern. As illustrated in FIGS. 37 and 38, the outside light such as the sunlight enters the illumination cover portion 10230 from the side (viewing side) opposite the planarly light-emitting portion 10221. The reflecting structure portion 10231 reflects the outside light to the side opposite the planarly light-emitting portion 10221.

The reflecting structure portion 10231 according to the present embodiment is provided by forming a complicated uneven structure 10232 on the viewing side surface of the illumination cover portion 10230. In more detail, the complicated uneven structure 10232 uses a diamond-cut structure. A plurality of reflection surfaces 10232*a* are formed into a mirror surface on the uneven structure 10232 and are oriented in different directions. The outside light enters from the side opposite the planarly light-emitting portion 10221 and is reflected to the side opposite the planarly light-emitting portion 10221 in various directions.

The illumination device 10220 according to the thirteenth embodiment includes a near-infrared light-emitting element 10222 and a plurality of visible light-emitting elements 10226 to emit the visible mixed light as the visible light. Each visible light-emitting element 10226 uses a light-emitting diode, for example. The present embodiment provides two visible light-emitting elements 10226 placed at both sides of the near-infrared light-emitting element 10222 so as to sandwich the near-infrared light-emitting element 10222. The visible light-emitting element 10226 is connected to a power supply via the conductive pattern on the substrate 10070 to emit the visible mixed light to a planarly light-emitting optical element 10223. The visible light-emitting element 10226 according to the present embodiment can emit the white light as the visible mixed light but may emit the light in other colors such as green light and red-oriented light.

The planarly light-emitting optical element 10223 according to the thirteenth embodiment provides a prism lens mainly formed of a translucent base material made of synthetic resin such as polycarbonate resin or acrylic resin. The planarly light-emitting optical element 10223 is shaped into a block. An entry plane 10223*a* of the planarly light-emitting optical element 10223 is formed flat and has an area capable of simultaneously facing the near-infrared light-emitting element 10222 and the visible light-emitting elements 10226. A facing surface 10223*b* of the planarly light-emitting optical element 10223 faces the illumination cover portion 10230. The facing surface 10223*b* is formed flat and has an area larger than the entry plane 10223*a* to almost entirely cover the reflecting structure portion 10231.

The planarly light-emitting optical element 10223 has no components to diffuse the illuminating light and the visible mixed light because the entry plane 10223*a* and the facing surface 10223*b* are formed into a mirror surface. However, the planar light emission is available by partially reflecting the light to a sidewall reflection surface 223*c* in the course of an optical path from the entry plane 10223*a* to the facing surface 10223*b* in comparison with a case where the near-infrared light-emitting element 10222 and the visible light-emitting elements 10226 directly emit the illuminating light and the visible mixed light.

Figure 36:
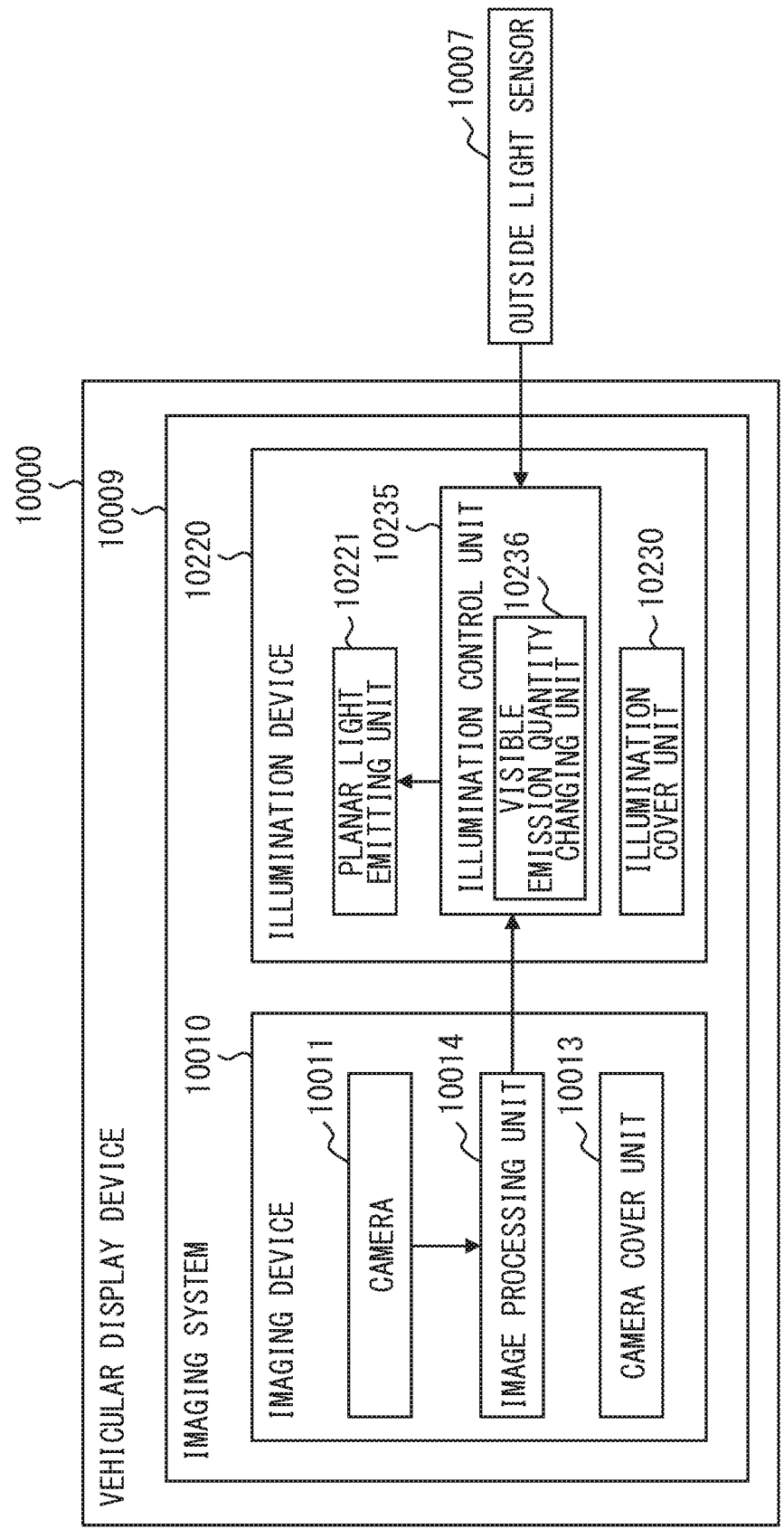
FIG. 36 is a block diagram illustrating a vehicular display device, an imaging system, an imaging device, and an illumination device according to the thirteenth embodiment.

As illustrated in FIG. 36, an illumination control portion 10235 of the illumination device 10220 includes a visible emission quantity changing portion 10236. The visible emission quantity changing portion 10236 controls the on/off state of each visible light-emitting element 10226 and controls the amount of light emission when the visible light-emitting element 10226 turns on.

The illumination control portion 10235 according to the present embodiment can communicate with an outside light sensor 10007 mounted on an upper surface portion of the instrument panel and the image processing portion 10014 in the vehicle. The outside light sensor 10007 can detect the outside light. The camera 10011 can also detect the outside light. The detection results are acquired from the outside light sensor 10007 and the image processing portion 10014, making it possible to estimate the brightness around the illumination device 10220.

Figure 39:
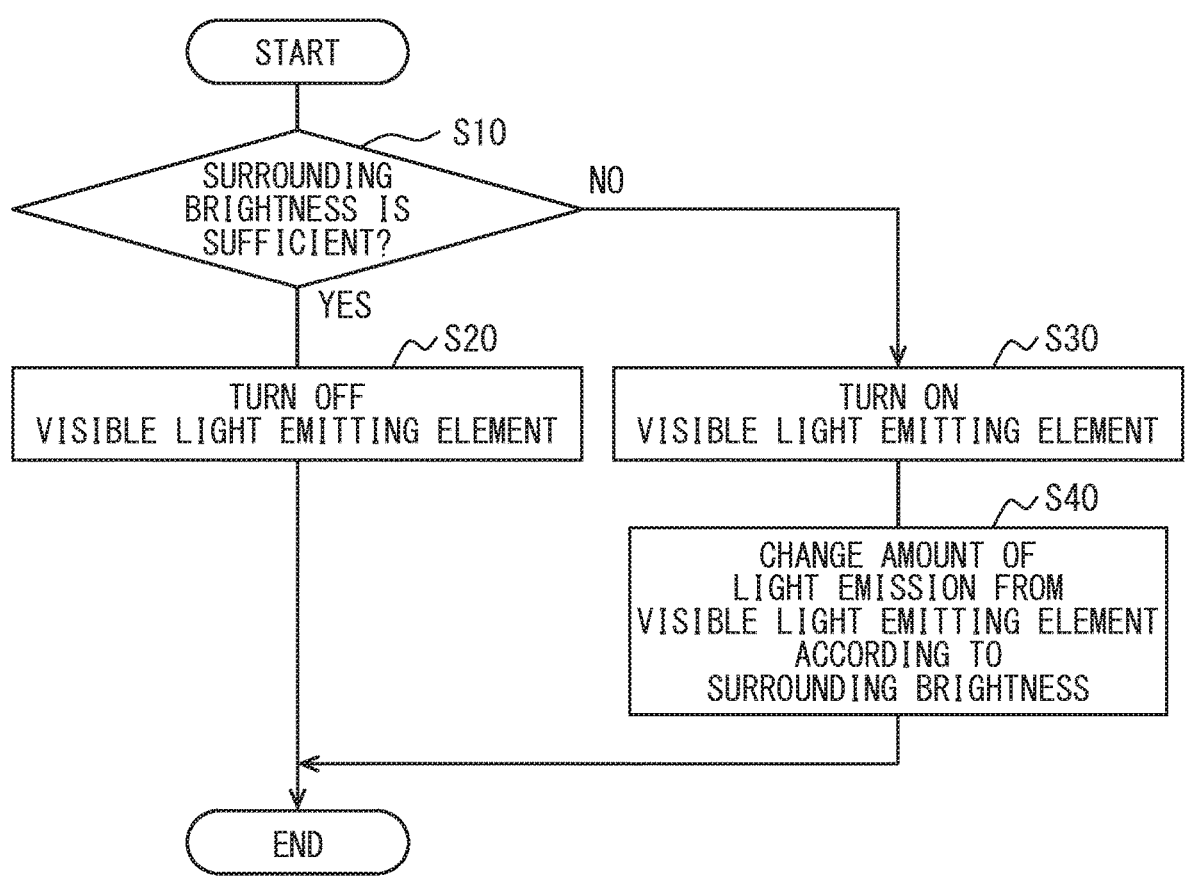
FIG. 39 is a flowchart illustrating a process of a visible emission quantity changing portion according to the thirteenth embodiment.

As illustrated in a flowchart of FIG. 39, the illumination control portion 10235 is supplied with a detection result from the outside light sensor 10007. The visible emission quantity changing portion 10236 determines the value (see S10 in FIG. 39) and changes the amount of light emission from each visible light-emitting element 10226. In more detail, when the amount of outside light detected by the outside light sensor 10007 is greater than or equal to a predetermined amount, the visible emission quantity changing portion 10236 changes the amount of light emission from each visible light-emitting element 10226 to zero. Namely, each visible light-emitting element 10226 turns off (see S20 in FIG. 39). When the amount of outside light detected by the outside light sensor 10007 is smaller than a predetermined amount, the visible emission quantity changing portion 10236 turns on each visible light-emitting element 10226 (see S30 in FIG. 39) and changes the amount of light emission from each visible light-emitting element 10226 so that the amount of light emission from each visible light-emitting element 10226 increases as the amount of outside light detected by the outside light sensor 10007 decreases (see S40 in FIG. 39).

When the surroundings are sufficiently bright during the daytime, for example, the visible light-emitting elements 10226 turn off as illustrated in FIG. 37. The near-infrared light-emitting element 10222 turns on. The illuminating light as the near-infrared light including the upper-bound visible light emitted from the near-infrared light-emitting element 10222 passes through the planarly light-emitting optical element 10223 and the reflecting structure portion 10231 to be planarly emitted. The outside light reflecting off the reflecting structure portion 10231 is mixed with the near-infrared light including the upper-bound visible light. The occupant can hardly sense the upper-bound visible light as being distinct. The sensing limit value CV increases. There is a high tolerance for allowing the luminosity per unit area at the maximal position MP of the planarly light-emitting portion 10221 to be smaller than the sensing limit value CV.

However, the outside light (see broken-line arrows in FIG. 38) is insufficient as illustrated in FIG. 38 when the surroundings are dark at night, for example. It is difficult to mix the outside light with the illuminating light as the near-infrared light including the upper-bound visible light. Then, the visible emission quantity changing portion 10236 turns on the visible light-emitting elements 10226. The planarly light-emitting optical element 10223 provides the planar light emission by mixing the illuminating light as the near-infrared light including the upper-bound visible light emitted from the near-infrared light-emitting element 10222 with the visible mixed light emitted from the visible light-emitting elements 10226. The visible mixed light is mixed with the illuminating light as the near-infrared light including the upper-bound visible light passing through the reflecting structure portion 10231. The occupant can hardly sense the upper-bound visible light as being distinct. The sensing limit value CV increases. There is a high tolerance for allowing the luminosity per unit area at the maximal position MP of the planarly light-emitting portion 10221 to be smaller than the sensing limit value CV.

The white light as the visible mixed light refracts while passing through the reflection surface 10232*a* of the reflecting structure portion 10231 and causes the chromatic aberration to generate a complicated optical pattern corresponding to the uneven structure 10232. The occupant can more hardly sense the upper-bound visible light as being distinct.

According to the above-described thirteenth embodiment, the illumination cover portion 10230 includes the reflecting structure portion 10231 that reflects the outside light entering the illumination cover portion 10230 from a side opposite the planarly light-emitting portion 10221 to the side opposite the planarly light-emitting portion 10221. The outside light reflecting off the reflecting structure portion 10231 is mixed with the upper-bound visible light from the planarly light-emitting portion 10221. The occupant can hardly sense the upper-bound visible light as being distinct. As a result, the sensing limit value CV increases. It is easily possible to allow the luminosity per unit area at the maximal position MP to be smaller than the sensing limit value CV. Therefore, it is possible to restrain a complicated impression from being given to the occupant.

According to the thirteenth embodiment, the planarly light-emitting optical element 10223 provides the planar light emission by mixing the near-infrared light including the upper-bound visible light emitted from the near-infrared light-emitting element 10222 with the visible mixed light emitted from the visible light-emitting element 10226. The visible mixed light is mixed with the upper-bound visible light. The occupant can hardly sense the upper-bound visible light as being distinct. As a result, the sensing limit value CV increases. It is easily possible to allow the luminosity per unit area at the maximal position MP to be smaller than the sensing limit value CV. Therefore, it is possible to restrain a complicated impression from being given to the occupant.

A decrease in the surrounding outside light also decreases the outside light that reflects off the reflecting structure portion 10231 and is mixed with the upper-bound visible light from the planarly light-emitting portion 10221. As a result, it is likely that the occupant can easily sense the upper-bound visible light as being distinct and the sensing limit value CV decreases.

However, the thirteenth embodiment changes the amount of light emission from the visible light-emitting element

10226 in accordance with the surrounding brightness. It is possible to restrain a variation in the sensing limit value CV in accordance with the surrounding brightness by changing the amount of the emitted visible mixed light to be mixed with the upper-bound visible light in accordance with the surrounding brightness. Therefore, it is always possible to allow the luminosity per unit area at the maximal position MP to be smaller than the sensing limit value CV. It is possible to reliably restrain a complicated impression from being given to the occupant.

The thirteenth embodiment changes the amount of light emission from the visible light-emitting element 10226 so that a decrease in the surrounding outside light increases the amount of light emission from the visible light-emitting element 10226. A decrease in the outside light is compensated by an increase in the visible mixed light mixed with the upper-bound visible light from the planarly light-emitting portion 10221, making it possible to suppress a decrease in the sensing limit value CV. It is easily possible to allow the luminosity per unit area at the maximal position MP to be smaller than the sensing limit value CV. Therefore, it is possible to restrain a complicated impression from being given to the occupant.

In terms of the embodiments, the description below explains the luminosity of the illuminating light per unit area and appropriate conditions on color ratios for a mixture of the upper-bound visible light and the visible mixed light.

In the description below, a daytime environment is defined on condition that the interior brightness is greater than or equal to 500 lx and less than 100,000 lx, the weather is fine, and the vehicle light turns off. A sunrise/sunset/night environment is defined on condition that the interior brightness is greater than or equal to 0 lx and less than 500 lx and the vehicle light turns on. The vehicle windshield is assumed to be transparent. The display plate 10040 of the vehicular display device 10100 is assumed to be mostly colored black.

The description below first explains the illuminating light luminosity per unit area. Under the daytime environment, the occupant cannot sense the upper-bound visible light as being distinct by setting the illuminating light luminosity per unit area to be 5 cd/m$^2$ or less at the maximal position MP for the planarly light-emitting portions 10021 and 10221 that planarly emit the illuminating light as the near-infrared light including the upper-bound visible light. Under the sunrise/sunset/night environment, the occupant cannot sense the upper-bound visible light as being distinct by setting the illuminating light luminosity per unit area to be 0.5 cd/m$^2$ or less at the maximal position MP for the planarly light-emitting portions 10021 and 10221.

The sensing limit value CV is also affected by the visible display light luminosity per unit area according to the display light source portion 10050 of the vehicular display device 10100. Specifically, it is difficult to distinctly sense the upper-bound visible light by setting the illuminating light luminosity per unit area to 5% or less of the visible display light luminosity per unit area.

Specifically, the vehicular display device 10100 according to the embodiments includes a dimming capability that sets the visible display light luminosity per unit area to 100 cd/m$^2$ under the daytime environment (or the light turned off) and reduces the visible display light luminosity per unit area to 10 cd/m$^2$ under the sunrise/sunset/night environment (or the light turned on). Meanwhile, the illumination devices 10020 and 10220 aim at satisfying the above-described condition of 5% or less by setting the illuminating light luminosity per unit area to 5 cd/m$^2$ or less under the daytime environment (or the light turned off) and reducing the illuminating light luminosity per unit area to 0.5 cd/m$^2$ or less under the sunrise/sunset/night environment (or the light turned off).

The description below explains color ratios for a mixture of the upper-bound visible light and the visible mixed light according to the thirteenth embodiment. Levels of sensing the upper-bound visible light as being distinct depend on visible mixed light colors such as white light, red light (wavelength of 620 to 780 nm), green light (wavelength of 495 to 570 nm), and blue light (wavelength of 450 to 495 nm). A mixture with the red light tends to be most effective because the upper-bound visible light is sensed as being least distinct. The other mixtures include a mixture with the green light, a mixture with the blue light, and a mixture with the white light in the order of the effectiveness.

When the visible mixed light is white, the upper-bound visible light is hardly sensed as being distinct by limiting a ratio of the radiant energy used for the visible mixed light to the radiant energy used for the upper-bound visible light to ten to one or less. When the visible mixed light is blue, the upper-bound visible light is hardly sensed as being distinct by limiting a ratio of the radiant energy used for the visible mixed light to the radiant energy used for the upper-bound visible light to ten to two or less. When the visible mixed light is green, the upper-bound visible light is hardly sensed as being distinct by limiting a ratio of the radiant energy used for the visible mixed light to the radiant energy used for the upper-bound visible light to ten to three or less.

When the visible mixed light is red, there is little distinction between the color of the visible mixed light and the color of the upper-bound visible light. Therefore, there is no limit on the ratio of the radiant energy used for the upper-bound visible light to the radiant energy used for the visible mixed light.

As a seventeenth modification, the illumination device 10020 may be placed adjacently to the index 10042, the indicating lamp, the image indicator 10038 formed on the display region DA of the display plate 10040. The illumination device 10020 may be placed adjacently to decoration parts illuminating around a range of rotationally moving the pointer 10060. The noticeability to the display region DA can be used to make the visible display light less recognizable.

Figure 40:
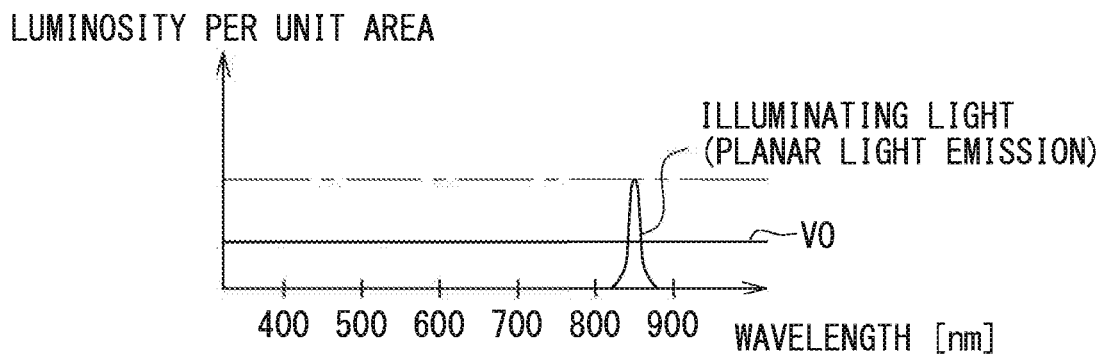
FIG. 40 is a spectral distribution chart illustrating an example of a seventeenth modification, namely the illuminating light based on point light emission according to the comparative example in FIG. 34 when the yellow-green light is unavailable nearby.
Figure 41:
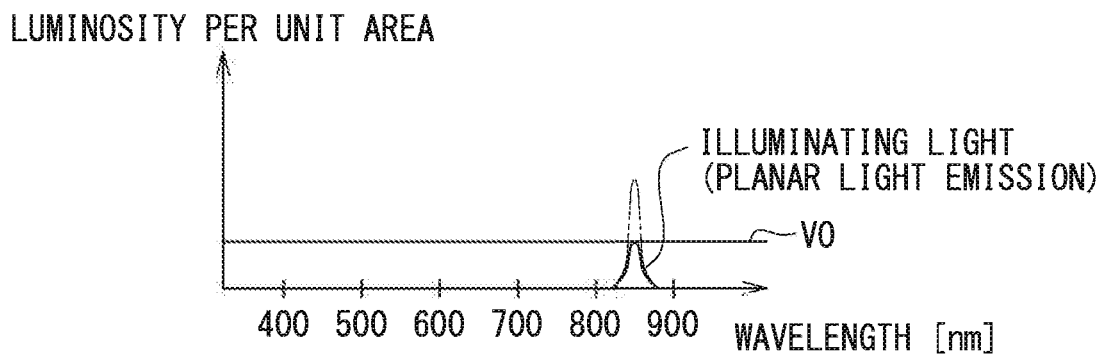
FIG. 41 is a spectral distribution chart illustrating an example of the seventeenth modification, namely the illuminating light based on planar light emission when the yellow-green light is unavailable nearby.

A spectral distribution chart in FIG. 40 illustrates a case where the illumination device 10920 for local light emission illustrated in FIG. 34 is not placed adjacently to the display region DA. In this case, the illuminating light luminosity per unit area exceeds a recognition threshold value V0 corresponding to the sensing limit value CV (represented by a dot-and-dash line in FIGS. 40 and 41). A spectral distribution chart in FIG. 41 illustrates a case where the illumination device 10020 for planar light emission is not placed adjacently to the display region DA. In this case, the planarly distributed light causes the illuminating light luminosity per unit area at the maximal position MP to be smaller than the recognition threshold value V0 (represented by a broken line in FIG. 42).

Figure 42:
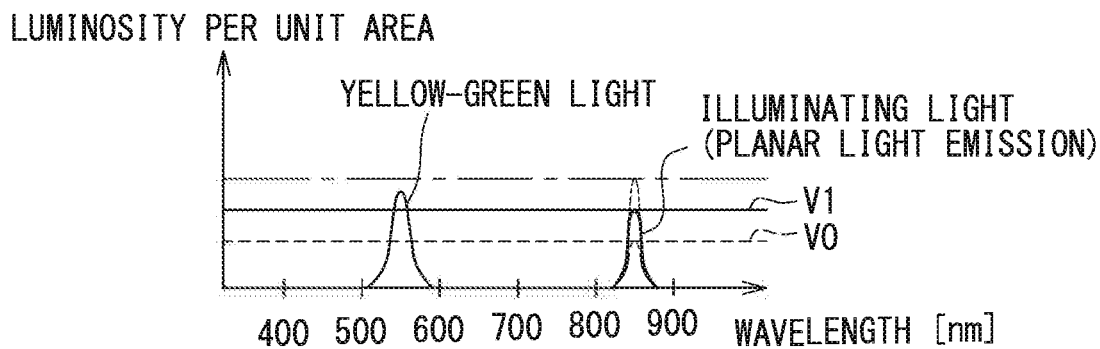
FIG. 42 is a spectral distribution chart illustrating an example of the seventeenth modification, namely the illuminating light based on planar light emission when the yellow-green light is available nearby.

A spectral distribution chart in FIG. 42 illustrates a case where the illumination device 10020 is placed adjacently to the display region DA emitting the yellow-green light. In this case, the noticeability to the yellow-green light occurs to increase the recognition threshold value from V0 to V1. It is possible to improve a margin for causing the luminosity per unit area at the maximal position MP to be smaller than the sensing limit value CV. It is possible to restrain the light emission area from increasing while maintaining the total amount of illuminance energy. As a result, the illumination device 10020 can be formed to conserve space even when the planarly light-emitting portion 10021 is configured to planarly emit the light.

As an example configuration, the illumination device 10020 is placed adjacently to a liquid crystal indicator using the yellow-green display light as a backlight or a VFD (vacuum fluorescent display) using a fluorescent display tube.

Figure 43:
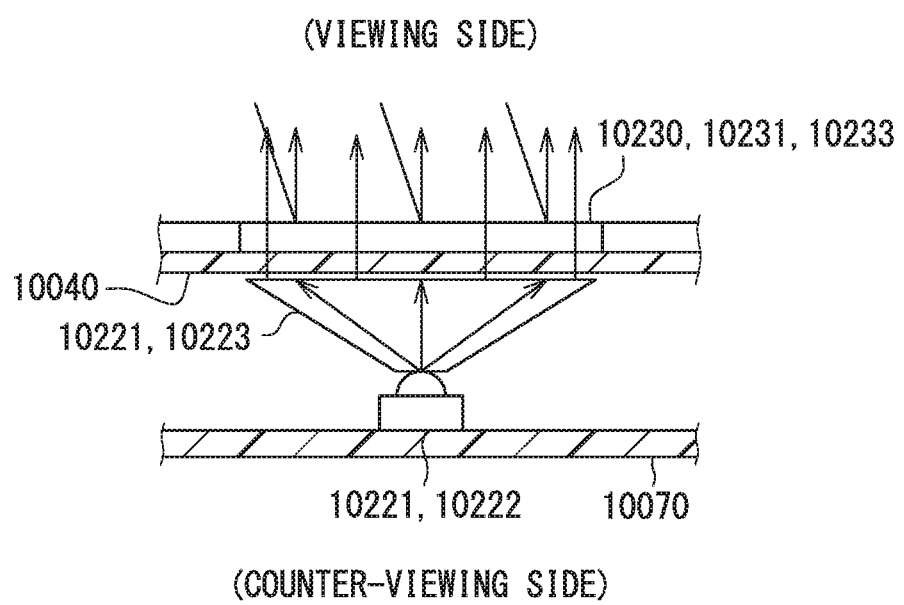
FIG. 43 is a sectional view illustrating an illumination device according to a nineteenth modification.

FIG. 43 illustrates an eighteenth modification concerning the thirteenth embodiment. For example, the reflecting structure portion 10231 may be formed by printing a metallic hairline structure 10233 on part of the surface of the display plate 10040 corresponding to the illumination cover portion 10230. The metallic hairline structure 10233 is formed by forming a plurality of fine metal lines capable of reflecting the outside light concentrically with the pointer shaft and providing a transmissive region capable of transmitting the illuminating light between the fine metal lines. The reflecting structure portion 10231 using the metallic hairline structure 10233 can also reflect the outside light entering the illumination cover portion 10230 from a side opposite the planarly light-emitting portion 10221 to the side opposite the planarly light-emitting portion 10221.

As a nineteenth modification concerning the thirteenth embodiment, the display plate 10040 used for the illumination cover portion 10230 may be replaced by a reflecting ring as a decoration part surrounding a range of rotationally moving the pointer 10060. The reflecting ring is configured as a flimsy metallic thin film formed by plating or evaporating the metal such as tin or silver on the viewing side surface of a translucent base material made of a synthetic resin such as polycarbonate resin or acrylic resin, for example. The metallic thin film functions as the reflecting structure portion 10231 like a one-way mirror or a half mirror. The reflecting ring as the illumination cover portion 10230 is formed to be able to reflect the outside light entering from a side opposite the planarly light-emitting portion 10221 to the side opposite the planarly light-emitting portion 10221 and transmit the illuminating light.

As a twentieth modification concerning the thirteenth embodiment, the illumination cover portion 10230 may be configured to form the index 10042 and thereby add a function of illuminating the index 10042 to the visible light-emitting element 10226 emitting the visible mixed light.

As a twenty-first modification concerning the thirteenth embodiment, the backlight for the image indicator 10038 may be replaced by the planarly light-emitting portion 10221 to display image by using the visible mixed light.

As a twenty-second modification, the display plate 10040 may be printed in red or white instead of black to increase the sensing limit value CV.

As a twenty-third modification, the illumination cover portion 10030 may not be provided. The planarly light-emitting optical element 10023 may be exposed in the space surrounded by the facing plate and the transparent plate of the vehicular display device 10100. In this case, the reflecting structure portion 10231 may be formed for the planarly light-emitting optical element 10023.

As a twenty-fourth modification, the planarly light-emitting optical element 10023 is not limited to a prism lens but may be provided as a diffuser panel and may be combined with a MEMS-based diffraction grating, microlens, or mirror array.

As a twenty-fifth modification, two or more near-infrared light-emitting elements 10022 may be provided for one planarly light-emitting optical element 10023.

As a twenty-sixth modification, the planarly light-emitting portion 10021 may be formed to be planar by placing tiny local light sources with small gaps insomuch as the planar light emission is available. The planarly light-emitting portion 10021 may be formed to be planar by placing fine-line light sources with small gaps.

As a twenty-seventh modification, it may be acceptable to form two or more maximal positions MP each of which maximizes the illuminating light luminosity per unit area in the planarly light-emitting portion 10021. The planarly light-emitting portion 10021 may planarly emit the light so that the whole region substantially provides the equal illuminating light luminosity per unit area. In this case, the whole region corresponds to the maximal position MP.

As a twenty-eighth modification, the illumination device 10020 or the imaging system 10009 including the illumination device 10020 is not necessarily placed inside the vehicular display device 10100. The illumination device 10020 or the imaging system 10009 including the illumination device 10020 may be placed as an independent assembly placed near the vehicular display device 10100. The illumination device 10020 or the imaging system 10009 including the illumination device 10020 may be placed as an independent assembly placed away from the vehicular display device 10100. As available configurations, the illumination device 10020 of the imaging system 10009 may be placed inside the vehicular display device 10100 and the imaging device 10010 may be placed outside the vehicular display device. The imaging device 10010 may be placed inside the vehicular display device 10100 and the illumination device 10020 is placed outside the vehicular display device 10100. The planarly light-emitting portion 10021 of the illumination device 10020 may be placed inside the vehicular display device 10100 and the other parts of the illumination device 10020 and the imaging device 10010 may be placed outside the vehicular display device 10100.

As a twenty-ninth modification, the illumination device 10020 or the imaging system 10009 including the illumination device 10020 may be placed inside an instrument (such as a manipulation panel for an audio, car navigation system, or air conditioner) to display or manipulate various functions of the vehicle.

As a thirtieth modification, an imaging target for the imaging device 10010 is not limited to the face of an occupant. For example, a hand or an arm of the occupant may be recognized as an imaging target to determine the gestural manipulation or a physical condition such as the pulse wave of the occupant.

The flowcharts or the processing depicted in the flowcharts described in the present disclosure include a plurality of sections (also referred to as steps) each of which is expressed as S100 or the like. Each of the sections can further be divided into a plurality of subsections, or a plurality of sections can be combined together to configure a single section. These sections can alternatively be referred to as circuits, devices, modules, or means.

Each of the plurality of sections or some of the sections combined to each other can be embodied as (i) a software section combined with a hardware unit (e.g., a computer) or (ii) a hardware section (e.g., an integrated circuit or a wiring logic circuit) including or excluding a function of a relevant device. Furthermore, the hardware unit can be configured inside a microcomputer.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A vehicular display device configured to display information, the vehicular display device comprising:
   a near-infrared irradiation portion configured to emit near-infrared light including light having an upper-bound wavelength of visible light to a viewing side; and
   a disguise portion configured to disguise the light having the upper-bound wavelength of the visible light, wherein
   the disguise portion includes a light-emitting display portion configured to display the information by emitting visible display light;
   the light-emitting display portion emits the visible display light mixed with the near-infrared light including the light having the upper-bound wavelength of the visible light emitted by the near-infrared irradiation portion;
   the light-emitting display portion includes:
      an image indicator configured to display an image by illumination;
      a translucent cover portion placed in the viewing side away from the image indicator; and
      an optical bonding portion that fills a gap between a display screen of the image indicator and the translucent cover portion; and
   the near-infrared irradiation portion is configured to supply the optical bonding portion with the near-infrared light including the light having the upper-bound wavelength of the visible light.

2. The vehicular display device according to claim 1, wherein:
   the light-emitting display portion includes a red-oriented display region configured to emit red-oriented light as the visible display light; and
   the light-emitting display portion causes the red-oriented display region to emit the red-oriented light mixed with the near-infrared light including the light having the upper-bound wavelength of the visible light emitted by the near-infrared irradiation portion.

3. The vehicular display device according to claim 1, wherein:
   the light-emitting display portion includes a yellow-green display region configured to emit light having a yellow-green wavelength as the visible display light; and
   the light-emitting display portion causes the yellow-green display region to emit the light having the yellow-green wavelength mixed with the near-infrared light including the light having the upper-bound wavelength of the visible light emitted by the near-infrared irradiation portion.

4. The vehicular display device according to claim 1, wherein:
   the light-emitting display portion includes a white display region configured to emit white light as the visible display light;
   the light-emitting display portion causes the white display region to emit the white light mixed with the near-infrared light including the light having the upper-bound wavelength of the visible light emitted by the near-infrared irradiation portion; and
   the white display region emits the white light with light intensity higher than light intensity of the light having the upper-bound wavelength of the visible light.

5. A vehicular display device configured to display information, the vehicular display device comprising:
   a near-infrared irradiation portion configured to emit near-infrared light including light having an upper-bound wavelength of visible light to a viewing side; and
   a disguise portion configured to disguise the light having the upper-bound wavelength of the visible light, wherein:
   the disguise portion includes an outside light reflecting portion configured to reflect outside light entering from the viewing side to the viewing side and transmit light entering from a counter-viewing side;
   the outside light reflecting portion is placed in the viewing side away from the near-infrared irradiation portion; and
   the outside light reflecting portion transmits the near-infrared light including the light having the upper-bound wavelength of the visible light emitted by the near-infrared irradiation portion, and reflects the outside light mixed with the near-infrared light including the upper-bound visible light to the viewing side.

6. A vehicular display device configured to display information, the vehicular display device comprising:
   a near-infrared irradiation portion configured to emit near-infrared light including light having an upper-bound wavelength of visible light to a viewing side; and
   a disguise portion configured to disguise the light having the upper-bound wavelength of the visible light, wherein:
   the disguise portion includes an outside light reflecting portion configured to reflect outside light entering from the viewing side to the viewing side; and
   the outside light reflecting portion is placed adjacently to the near-infrared irradiation portion.

7. A vehicular display device configured to display information, the vehicular display device comprising:
   a near-infrared irradiation portion configured to emit near-infrared light including light having an upper-bound wavelength of visible light to a viewing side; and
   a disguise portion configured to disguise the light having the upper-bound wavelength of the visible light, wherein
   the disguise portion includes a red-oriented decoration portion formed in a red-oriented color and configured to decorate display of the information; and
   the red-oriented decoration portion is placed adjacently to the near-infrared irradiation portion.

8. A vehicular display device configured to display information, the vehicular display device comprising:
   a near-infrared irradiation portion configured to emit near-infrared light including light having an upper-bound wavelength of visible light to a viewing side; and
   a disguise portion configured to disguise the light having the upper-bound wavelength of the visible light, wherein:
   the disguise portion includes a light-emitting display portion configured to cause a display region to display the information by emitting visible display light;
   the near-infrared irradiation portion includes a near-infrared light transmitting region that transmits the near-infrared light including the light having the upper-bound wavelength of the visible light to the viewing side; and the display region is placed adjacently to the near-infrared light transmitting region.

9. The vehicular display device according to claim 8, wherein:

the light-emitting display portion includes, as the display region, a red-oriented display region configured to emit red-oriented light as the visible display light; and the red-oriented display region is placed adjacently to the near-infrared irradiation portion.

10. The vehicular display device according to claim 8, wherein:

the light-emitting display portion includes, as the display region, a yellow-green display region configured to emit light having a yellow-green wavelength as the visible display light; and the yellow-green display region is placed adjacently to the near-infrared irradiation portion.

11. The vehicular display device according to claim 8, wherein:

the light-emitting display portion includes, as the display region, a white display region configured to emit white light as the visible display light;

the white display region is placed adjacently to the near-infrared irradiation portion.

12. A vehicular display device configured to display information, the vehicular display device comprising:

a near-infrared irradiation portion configured to emit near-infrared light including light having an upper-bound wavelength of visible light to a viewing side; and a disguise portion configured to disguise the light having the upper-bound wavelength of the visible light, wherein:

the disguise portion includes a light-emitting decoration portion configured to emit visible decoration light to decorate the display of the information;

the light-emitting decoration portion includes an uneven transmissive structure having a plurality of refracting surfaces that cause the visible decoration light to cause chromatic aberration; and the light-emitting decoration portion emits the visible decoration light, in which the chromatic aberration is caused, mixed with the near-infrared light including the light having the upper-bound wavelength of the visible light emitted by the near-infrared irradiation portion.

13. The vehicular display device according to claim 1, further comprising:

an imaging portion configured to image an imaging target emitted by the near-infrared irradiation portion.

14. An illumination device configured to emit illuminating light to image an occupant of the vehicle, the illumination device comprising:

a planarly light-emitting portion configured to planarly emit the illuminating light as near-infrared light including light having an upper-bound wavelength of visible light, wherein:

the planarly light-emitting portion causes luminosity of the illuminating light per unit area at a maximal position, which maximizes the luminosity of the illuminating light per unit area, to be smaller than a sensing limit value, and the sensing limit value is a lower limit value that enables the occupant to distinctly sense the light having the upper-bound wavelength of the visible light;

the illumination device further comprises a cover portion configured to cover the planarly light-emitting portion and transmit the illuminating light; and the cover portion includes a reflecting structure portion configured to reflect outside light entering the cover portion from a direction opposite to the planarly light-emitting portion to the direction opposite to the planarly light-emitting portion.

15. The illumination device according to claim 14, wherein:

the illumination device is placed inside a vehicular display device configured to display information to a viewing side; and the cover portion is provided in an exposed component of the vehicular display device exposed to the viewing side.

16. The illumination device according to claim 14, wherein the planarly light-emitting portion includes:

a near-infrared light-emitting element configured to emit the near-infrared light including the light having the upper-bound wavelength of the visible light; and a planarly light-emitting optical element configured to planarly emit the near-infrared light including the light having the upper-bound wavelength of the visible light emitted from the near-infrared light-emitting element.

17. The illumination device according to claim 16, wherein the planarly light-emitting portion further includes a visible light-emitting element configured to emit visible mixed light as the visible light; and the planarly light-emitting optical element mixes the near-infrared light including the light having the upper-bound wavelength of the visible light emitted from the near-infrared light-emitting element with the visible mixed light emitted from the visible light-emitting element, and planarly emits the near-infrared light and the visible mixed light.

18. The illumination device according to claim 17, further comprising:

a visible emission quantity changing portion configured to change an amount of light emission from the visible light-emitting element corresponding to surrounding brightness.

19. A illumination device configured to emit illuminating light to image an occupant of the vehicle, the illumination device comprising:

a planarly light-emitting portion configured to planarly emit the illuminating light as near-infrared light including light having an upper-bound wavelength of visible light, wherein:

the planarly light-emitting portion causes luminosity of the illuminating light per unit area to be smaller than a sensing limit value at a maximal position that maximizes the luminosity of the illuminating light per unit area, and the sensing limit value is a lower limit value that enables the occupant to distinctly sense the light having the upper-bound wavelength of the visible light;

the illumination device further comprises a cover portion configured to cover the planarly light-emitting portion and transmit the illuminating light;

the cover portion includes a reflecting structure portion configured to reflect outside light entering the cover portion from a direction opposite to the planarly light-emitting portion to the direction opposite to the planarly light-emitting portion; and the planarly light-emitting portion includes:
- a near-infrared light-emitting element configured to emit the near-infrared light including the light having the upper-bound wavelength of the visible light;
- a visible light-emitting element configured to emit visible mixed light as the visible light;
- a planarly light-emitting optical element configured to mix the near-infrared light including the light having the upper-bound wavelength of the visible light emitted from the near-infrared light-emitting element with the visible mixed light emitted from the visible light-emitting element, and planarly emit the near-infrared light and the visible mixed light; and
- a visible emission quantity changing portion configured to change an amount of light emission from the visible light-emitting element to increase the amount of light emission from the visible light-emitting element with a decrease of the surrounding outside light.

20. The illumination device according to claim 16, wherein:
- the planarly light-emitting optical element is made of a translucent base material and provided by a prism lens; and
- the planarly light-emitting optical element guides the near-infrared light including the light having the upper-bound wavelength of the visible light emitted from the near-infrared light-emitting element inside and planarly emits the near-infrared light.

* * * * *